US00RE44341E

(19) United States
(12) Reissued Patent
Rotem et al.

(10) Patent Number: US RE44,341 E
(45) Date of Reissued Patent: Jul. 2, 2013

(54) SYSTEM AND METHOD FOR PRODUCING STORAGE MEDIA IMAGES

(75) Inventors: Yoel Rotem, Tel Aviv (IL); Erez Wineberger, Tel Aviv (IL)

(73) Assignee: Calligramme Holdings FR L.L.C., Wilmington, DE (US)

(21) Appl. No.: 12/116,566

(22) Filed: May 7, 2008 (Under 37 CFR 1.47)

Related U.S. Patent Documents

Reissue of:
(64) Patent No.: 7,043,484
Issued: May 9, 2006
Appl. No.: 09/730,253
Filed: Dec. 5, 2000

(51) Int. Cl.
*G06F 17/30* (2006.01)

(52) U.S. Cl.
USPC ..... 707/756

(58) Field of Classification Search
USPC ..... 707/756
See application file for complete search history.

(56) References Cited

U.S. PATENT DOCUMENTS 5,691,972 A * 11/1997 Tsuga et al. ..... 369/275.3
5,745,645 A * 4/1998 Nakamura et al. ..... 386/233
5,771,334 A * 6/1998 Yamauchi et al. ..... 386/239
5,784,528 A * 7/1998 Yamane et al. ..... 386/329
5,854,873 A * 12/1998 Mori et al. ..... 386/241
5,860,068 A 1/1999 Cook
5,884,004 A * 3/1999 Sato et al. ..... 386/337
5,900,608 A 5/1999 Iida
5,905,845 A * 5/1999 Okada et al. ..... 386/244
5,907,659 A * 5/1999 Yamauchi et al. ..... 386/245
5,923,869 A * 7/1999 Kashiwagi et al. ..... 713/501
5,937,138 A * 8/1999 Fukuda et al. ..... 386/356
5,987,417 A * 11/1999 Heo et al. ..... 704/500
6,023,713 A 2/2000 Grimsrud et al.
6,064,796 A * 5/2000 Nakamura et al. ..... 386/233
6,065,006 A * 5/2000 deCarmo et al. ..... 1/1
6,088,507 A * 7/2000 Yamauchi et al. ..... 386/201
6,148,140 A * 11/2000 Okada et al. ..... 386/241
6,173,113 B1 * 1/2001 Okada et al. ..... 386/240
6,181,870 B1 * 1/2001 Okada et al. ..... 386/241
6,181,872 B1 * 1/2001 Yamane et al. ..... 386/332
6,263,150 B1 * 7/2001 Okada et al. ..... 386/283
6,308,005 B1 * 10/2001 Ando et al. ..... 386/241
6,330,392 B1 * 12/2001 Nakatani et al. ..... 386/288
6,336,002 B1 * 1/2002 Yamauchi et al. ..... 386/241
6,339,672 B1 * 1/2002 Ando et al. ..... 386/241
6,339,674 B1 * 1/2002 Ando et al. ..... 386/255
6,341,196 B1 * 1/2002 Ando et al. ..... 386/248
6,341,197 B1 * 1/2002 Ando et al. ..... 386/248
6,341,199 B1 * 1/2002 Okada et al. ..... 386/328
6,356,706 B1 * 3/2002 Ando et al. ..... 386/241
6,393,574 B1 * 5/2002 Kashiwagi et al. ..... 713/400

(Continued)

*Primary Examiner* — Michael Hicks
(74) *Attorney, Agent, or Firm* — Sterne, Kessler, Goldstein & Fox P.L.L.C.

(57) ABSTRACT

A system for producing custom media images, the system including a media server which includes a title database and a creation server connected to the media server, the title database containing a plurality of title records, each title record including a title description file and a plurality of compiled title media files, the creation server receiving a request to produce a media image from a selection of titles respective of the title records, the creation server producing a set of media management files according to the title description file of each the selected title records, and generating a media image containing the media management files and a copy of the compiled title media files of each the selected title records.

9 Claims, 13 Drawing Sheets

U.S. PATENT DOCUMENTS

| | | | | |
|---|---|---|---|---|
| 6,453,459 | B1 * | 9/2002 | Brodersen et al. | 717/100 |
| 6,473,902 | B1 | 10/2002 | Noritomi | |
| 6,493,505 | B1 * | 12/2002 | Okada et al. | 386/248 |
| 6,771,878 | B1 * | 8/2004 | Caramico et al. | 386/243 |
| 6,778,265 | B1 * | 8/2004 | Lin et al. | 356/125 |
| 6,856,755 | B1 * | 2/2005 | Lin et al. | 386/241 |
| 6,934,744 | B2 | 8/2005 | Sogabe et al. | |
| 7,043,484 | B2 * | 5/2006 | Rotem et al. | 386/332 |
| 7,082,257 | B2 | 7/2006 | Yamauchi et al. | |
| 7,099,561 | B1 * | 8/2006 | Lin et al. | 386/241 |
| 7,133,598 | B1 * | 11/2006 | Lin et al. | 386/232 |
| 7,184,648 | B1 * | 2/2007 | De Haan | 386/241 |
| 7,509,022 | B1 * | 3/2009 | Ishii et al. | 386/329 |
| 7,577,341 | B1 * | 8/2009 | De Haan | 386/248 |
| 2001/0036360 | A1 * | 11/2001 | Sogabe et al. | 725/116 |
| 2001/0053280 | A1 * | 12/2001 | Yamauchi et al. | 386/95 |
| 2002/0112226 | A1 * | 8/2002 | Brodersen et al. | 717/140 |

* cited by examiner

SYSTEM AND METHOD FOR PRODUCING STORAGE MEDIA IMAGES

Matter enclosed in heavy brackets [ ] appears in the original patent but forms no part of this reissue specification; matter printed in italics indicates the additions made by reissue.

FIELD OF THE INVENTION

The present invention relates to methods and systems for managing storage in general, and to methods and systems for managing media information and for producing storage media images, in particular.

BACKGROUND OF THE INVENTION

Methods and systems for managing information are known in the art. Data can be stored in non-volatile media such as ROM, magnetic storage devices such as diskettes and hard drives, optical storage devices such as the CD-ROM and the DVD-ROM, magneto-optic storage devices, and the like. Each of these storage devices may define a different format of storage thereon. For example UDF 1.5, ISO 9660.

A storage device can be used for different types of data and hence, may require different formats for each type of data. For example; Compact Disks were first designed for audio storage. Later, the CD-ROM format was added on the same physical specifications and enhanced the capabilities of the physical media to data applications.

A DVD-ROM used for multimedia data, requires that data would be printed thereon in a special format, which defines a plurality of data structures and modules. Reference is now made to FIG. 1, which is a schematic illustration of a DVD image, generally referenced 10, which is knows in the art. DVD image 10 includes a video manager (VMG) section 12 and a plurality of DVD titles 20A, 20B, 20C and 20L. Video manager section 12 includes a VIDEO_TS.IFO file 14, a VIDEO_TS.BUP file 16 and a VIDEO_TS.VOB file 18. VIDEO_TS.IFO file 14 includes file manager definitions relating to the DVD titles 20A, 20B, 20C and 20L such as the size and location of each DVD title within the DVD image 10. VIDEO_TS.BUP file 16 includes a backup copy of VIDEO_TS.IFO file 14. VIDEO_TS.VOB file 18 is a video file including a plurality of media streams (video, audio and others), which serve as a multimedia layer for presenting the manager definitions of VIDEO_TS.IFO file 14. A DVD player playing the DVD image, first accesses the Video Manager section 12, retrieves VIDEO_TS.IFO file 14 for the management definitions and plays VIDEO_TS.VOB file 18 as audio visual presentation thereof.

A DVD title such as DVD title 20L includes a title manager section 22 and a plurality of VOB files 30A, 30B, 30C and 30M. VOB files 30A, 30B, 30C and 30M are used for storing a plurality of media cells, and are limited in size to 1 GB. A media cell is a logical media component, which is associated with a logical section of the DVD title, such as a scene, a clip, and the like. A VOB file can include a plurality of media cells (e.g., when the total volume of these media cells is less than 1 GB). It is noted that a cell can extend over more than one VOB file (e.g., when size of that media cell is greater than 1 GB). Each of the media cells in a title can include a plurality of media streams such as a video stream, a plurality of audio streams, data streams (e.g., sub-titles), and the like. The VOB files are divided into a plurality of blocks, each being of the size of 2K bytes.

Title manager section 22 includes a VTS_L__0.IFO file 24, a VTS_L__0.BUP 26 and a VTS_L__0.VOB file 28. VTS_L__0.IFO file 24 includes file management definitions relating to the VOB files 30A, 30B, 30C and 30M, with respect to the media cells stored therein, such as the location of each media cell (i.e., VOB file identification and location within that VOB file), and the like.

VTS_L__0.BUP file 26 is a backup file, which is copy of VTS_L__0.IFO file 24. VTS_L__0.VOB file 28 is a video file including a plurality of media streams (video, audio and others), which serve as a multimedia layer for presenting the management definitions of VTS_L__0.IFO file 24. A DVD player playing the DVD title 20L of DVD image 10, accesses the title manager section 22, retrieves VTS_L__0.IFO file 24 for the management definitions of the title and plays VTS_L__0.VOB file 28 as audio visual presentation thereof.

The name format of titles related files includes an identification prefix (e.g., VTS), followed by a title number, followed by a sequential number, and ending with a suffix (e.g., IFO, BUP, VOB, and the like). For example, the file name $VTS_{13}3_{13}2$.VOB implies that this file is a title related file (VTS), embedding a plurality of multimedia sub-streams (VOB) of the third title (3), second in the VOB sequence of the film.

DVD image 10 can include up to 99 titles of media (e.g., each title can be a feature film). Conventional methods and systems for producing DVD-ROM media, receive media titles, analyze them, compile the titles into DVD format (i.e., create all of the VOB files, produce the above manager sections and determine the relations between them, and the like), produce a DVD image and then, print the image on DVD media. It will be appreciated by those skilled in the art that compilation of several GB of data into DVD format requires significant processing power as well as intermediate storage area.

DVD on demand defines a situation where a user provides an individual request for a selection of titles. A DVD production server retrieves the titles from a title repository, where they are commonly stored in digital format such as MPEG and compiles the titles into a DVD format image. The DVD production server then provides that image to a DVD writer, which in turn imprints that image on a DVD media. It is noted that compilation procedure of that DVD format image according to the request requires the same amount of resources, as would a DVD format image directed for mass production. Hence, the DVD production server is typically a high power server, characterized in high processing power, large volume of intermediate storage and a fast communication connection to the title storage repository and to the DVD writer.

It is noted that the compilation process of a conventional DVD title typically requires around several minutes, using state of the art DVD production servers.

U.S. Pat. No. 6,023,713 to Grimsrud et al., entitled "Optimized CD/DVD authoring employing block reallocation" is directed to a method for optimized CD/DVD authoring. At first, either a pre-final version of a CD/DVD having a first block allocation or a disk image of the pre-final version of the CD/DVD with the first block allocation, is created. Then, an alternate block allocation is generated. That alternate block allocation points to the first block allocation and yields improved overall access time for the content of the CD/DVD. Preferably, the alternate block allocation is based on the order of a selected subset or the entire content of the CD/DVD, which is accessed. A final version of the CD/DVD is then generated using the alternate block allocation.

U.S. Pat. No. 5,900,608 to Iida, entitled "Method of purchasing personal recording media, system for purchasing personal recording media, and media recorded with personal recording media purchasing program" is directed to a system for purchasing a personal recording media, and includes a first entering unit for entering an identification information in order to identify a customer, a unit connected to the first entering unit for identifying whether or not the customer is an authorized customer based on the entered identification information, a second entering unit connected to the identifying unit for entering at least one designated information by the customer when the customer is identified as an authorized customer in accordance with the identifying unit, a unit for storing a plurality of information, a unit connected to the second entering unit and the information storing unit for reading information associated with the designated information by retrieving the plurality of information in the information storing unit based on the designated information entered by the second entering unit, and a unit connected to the information reading unit for recording the information read from the information storing unit into a predetermined recording media.

U.S. Pat. No. 5,860,06 to Cook, entitled "Method and system for custom manufacture and delivery of a data product" is directed to a system for selling, manufacturing and distributing a custom digital data product from retail stores, over the Internet, over the telephone, or by electronic means (e.g., fax, e-mail, and the like). At first, the customer is provided (e.g., by electronic mail verification) order tracking information. After the customer selects a "set" of sound recordings or data from a library or catalog of such recordings or data and payment or credit is received or verified, an image of the "set" is assembled from a storage or "disk" farm. The image is preferably assembled at a manufacturing facility, e.g., a CD-ROM burner farm, where the product is then made. Every data object on the product may have a code associated therewith for later reference. The disk and burner farms communicate via a high-speed communications subsystem to facilitate continuous processing. Upon assembly and manufacture, the product is packaged and shipped. Throughout the manufacture and distribution, the customer may track the process by activating a hyperlink in one or more e-mail confirmation messages provided by the service provider, or by entering order/tracking numbers from retail terminals or by telephone, or the like.

SUMMARY OF THE PRESENT INVENTION

It is an object of the present invention to provide a novel method and system for producing DVD format images, which overcomes the disadvantages of the prior art.

In accordance with the present invention, there is thus provided a system for producing custom media images. The system includes a media server including a title database and a creation server connected to the media server. The title database contains a plurality of title records. Each title record includes a title description file and a plurality of compiled title media files. The creation server receives a request to produce a media image from a selection of titles respective of the title records. The creation server produces a set of media management files according to the title description file of each the selected title records, and generates a media image containing the media management files and a copy of the compiled title media files of each the selected title records.

In accordance with another aspect of the present invention, there is thus provided a method for producing a DVD image. The method includes the steps of receiving a request to produce a DVD image of selected titles, and retrieving a plurality of title description modules, each title description module being associated with a selected title. The method further includes the steps of generating a DVD management module from the title description module and producing a DVD image from the DVD management module and from compiled versions of the selected titles.

In accordance with a further aspect of the present invention, there is thus provided a method for producing a single DVD title from a plurality of DVD titles. The method includes the steps of modifying the title management section of the first DVD title, eliminating the title management section of each of the rest of the DVD titles and modifying the file numbers of the VOB files of each of the rest of the DVD titles to be in sequence with the VOB files of the first DVD title.

In accordance with another aspect of the present invention, there is thus provided a DVD database structure. The DVD database structure includes a cell database and a title record pointer database. The cell database includes a plurality of cell records. Each cell record includes a cell description section and a cell content section. The cell description section includes information relating to the cell content section. The title record pointer database includes a plurality of title pointer records. Each title pointer record includes a title description section and at least one pointer pointing to a specified cell record in the cell database.

In accordance with a further aspect of the present invention, there is thus provided a method for producing a DVD title from a plurality of selected DVD cell records. Each DVD cell record includes a cell description module and a cell content file. The method includes the steps of retrieving the cell description sections of each DVD cell record and generating at least one new DVD title management module from the cell description modules and from a cell management module.

In accordance with another aspect of the present invention, there is thus provided a method for producing a DVD image from a plurality of selected DVD cell records and a plurality of title pointer records. Each DVD cell record includes a title description module and a cell content file. Each title pointer record includes a title description module and pointers to at least one of the DVD cell records. The method includes the initial step of receiving a user request including at least one title pointer record or at least one cell record.

When the user request includes at least one title pointer record, the title management module of each title pointer record is retrieved, a new title management module is generated when certain ones of the selected titles are to be combined, and the cell content file of the respective DVD cell records associated with the selected title records is retrieved.

When the user request includes at least one DVD cell record, the title management module of each of the selected DVD cell record is retrieved, a new title management module is generated, and the cell content file of the respective DVD cell record associated with the selected title record is retrieved, when certain ones of the selected titles are to be combined.

The method further includes the steps of generating at least one DVD title from the title management module and from the retrieved cell content file, and generating a DVD management module from the title description module.

BRIEF DESCRIPTION OF THE DRAWINGS

The present invention will be understood and appreciated more fully from the following detailed description taken in conjunction with the drawings in which.

DETAILED DESCRIPTION OF PREFERRED EMBODIMENTS

Figure 1:
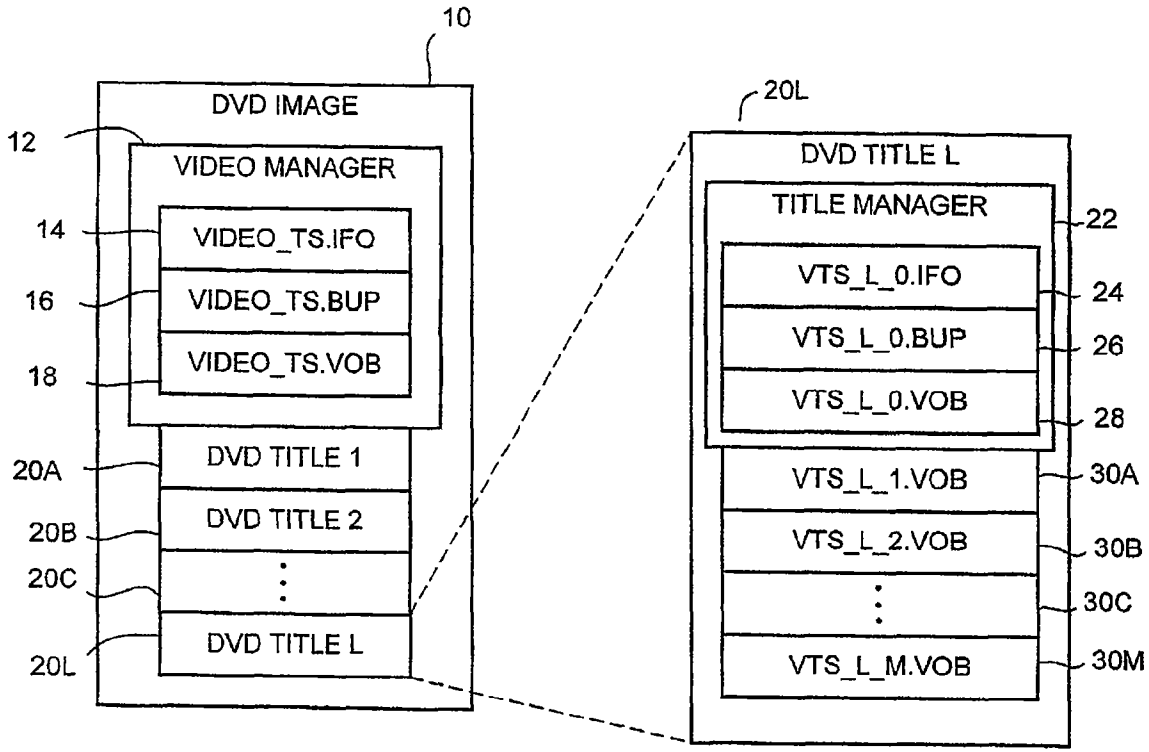
FIG. 1 PRIOR ART
FIG. 1 is a schematic illustration of a DVD image, which is knows in the art.

The present invention overcomes the disadvantages of the prior art, by providing a system and method for producing DVD format images, by dividing the image production process into two stages. The first stage is initial reception of a media title, preferably already compiled into DVD format (i.e., a non-compiled media title, is then compiled before initiating the first stage). The compiled media title is analyzed and stored in a database as a record, together with the results of the analysis.

In the second stage, when the title is included in a user request for producing a DVD format image, the title analysis is retrieved from title record and is used for producing video management sections required for DVD format. At the end of the second stage, the DVD management section and the already compiled DVD title are used to produce a DVD format image. Hence, the compiled title stored in the database, can be used again and again for producing different DVD images, without the need for compiling that title.

The following terms are used throughout the description using their attached abbreviations:

| | |
|---|---|
| VOB- | Video Object, set of video, audio and additional information needed to synchronize the video. |
| VOBU- | This is part of Vob and the presentation time is between 0.4 seconds and 1.0 seconds. |

-continued

| | |
|---|---|
| RLBN- | relative block number. Block contains 2048 bytes. |
| VMGM_VOBS- | video object set of video menu manager. |
| TT_SRPT- | title search pointer table. |
| VMGM_PGCI_UT- | Video menu manager PCG unit table. |
| VTS_ATRT- | video title set attributes table (contains all attribute table together). |
| VMGM_C_ADT- | Video menu manager cell address table. |
| VTS_PTT_SRPT- | VTS part of title search pointer table. |
| NV PACK- | Navigation Pack. This group of bytes contains information about user operation on the play of the DVD and seamless play of the DVD. |
| VTSM- | video title set menu (i.e the menu of the video title set). |
| OC_LVOBU_SA- | temporal parameter used by the patent, and means output C_LVOBU_SA. |
| OC_LVOBU_EA- | temporal parameter used by the patent, and means output C_LVOBU_EA. |
| VTS_ATRT_SIZE- | size of VTS attribute table. |
| VMG_VOBS- | Video manager vob set file. |
| TT_SRPT- | Title search pointer table. |
| VTS_ATRT- | attribute table of a title. Contains general information about the title (video system, audio system etc.). |
| VMGM_C_ADT- | Video menu manager cell address table. |
| VMGM_VOBU_ADM AP_SA- | start address of video menu manager address map. |
| TT_SRP_Ns- | number of title search pointers. |
| TT_SRPT_EA- | end address of title search pointer table. |
| TT_PB_TY- | title playback time. |
| ANGLE_Ns- | number of angles. |
| VTS_PTT_SRPT#I- | VTS part of title search pointer table for title referred by index i. |
| PGC- | program chain. Navigation data to control the presentation of the video. |
| PGC SIZE- | size of PGC. |
| LU POINTER SIZE- | size of language unit pointer table. |
| VMGM_PGCI_UT- | video menu manager FOC information unit table. |
| VMGM_LU- | video menu manager language unit. |
| VMGM_PGCI_SRP- | search pointers to video menu manager program chain information. |
| VMGM_PGC- | video menu manager program chain. |
| VMGM_PGCI- | video menu manager program chain information. |
| PGC#i- | PGC related by index i. |
| VTS_ATR- | video title set attribute. |
| TTL_DESC#i- | a file created by us which contains description about the title, index i. |
| VTS_CAT- | video title set category Karaoke or normal video. |
| VTS_ATTRIBUTE- | see VTS_ATR. |
| VTS- | video title set (contains DVD title and its menu). |
| VTSI- | video title set information. |
| VTS_EA- | end address of VTSI. |
| VTS_CAT- | VTS category contains zone restrictions of the DVD. |
| VTS ATTRIBUTE- | contains information about the VTS its audio. video parameters, sub titles etc. |
| VTS_PTT_SRPT- | VTS part of title search pointer table. |
| VOB_EA- | end address of the VOB file. |
| C_LVOBU_SA- | start address of the last VOBU in the cell. |
| C_LVOBU_EA- | end address of the last VOBU in the cell. |
| VMGI- | Video manager general information. |
| VMGI_EA- | End address of the VMGI. |
| VMGM- | Video manager menu. |
| VMGM_VOBS_SA- | start address of video VMGM's video object set. |
| TT_SRPT SA- | Start address of title search pointer table. |
| PGCI- | program chain information. |
| VMGM_PGCI_UT_S A- | Video menu manages PCG unit table start address. |
| VMGM_PGCI_UT_E A- | Video menu manager PCG unit table end address. |
| VTS_ATRT_SA- | video title set attribute table start address. |
| VMGM_C_ADT_SA- | Video menu manager cell address table start address. |

-continued

| | |
|---|---|
| VMG_EA- | video manager end address. |
| PTT_Ns- | number of part of title (VTS title can contain part of titles). |
| C_LVOBU_SA- | start address of the first VOBU in the cell. |
| C_LVOBU_EA- | end address of the first VOBU in the cell. |
| VMGM_CP_EA- | video manager menu cell piece end address. |
| RLBN- | Relative block number, (block = 2048 bytes). |
| TT_PTL_ID_FLD- | parental ID field for a specific title. |
| VTSN- | Video Title Set Number. |
| VTS_TTN- | video title number (title set can contain several titles). |
| VTS_SA- | Video title set start address. |
| VMGM_LU_Ns- | video manager menu language unit number. |
| VMGM_LCD- | video manager menu language code. |
| VMGM_EXST- | video manager menu existence. |
| VMGM_LU_SA- | video manager language unit start address. |
| VMGM_PGCI_SRP_ Ns- | number of search pointers to video menu manager program chain information. |
| VMGM_LU_EA- | video manager language unit end address. |
| VMGM PGC CAT- | video menu manager program chain category. |
| VMGM_PGCI_SA- | start address of video menu manager program chain general information table. |
| PGC- | program chain. Navigation data to control the presentation of the video. |
| VTS_Ns- | number of video title sets. |
| VTS_ATRT_EA- | end address of video title set attributes table (contains all attribute table together). |
| VTS_ATR_SA- | start address of specific video title set attribute table. |
| VTS_ATR_EA- | end address of specific video title set attribute table. |
| VTS_CAT- | video title set category. |
| VTS_ATRI- | video title set attribute table information. |
| VMGM_VOB_Ns- | number of video menu manager Vob units. |
| VMGM _C_ADT__EA- | Video menu manager cell address table end address. |
| VMGM_VOB_IDN- | video menu manager VOB ID number. |
| VMGM_C_IDN- | video manager cell ID number. |
| VMGM_CP_SA- | start address of first VOBU in cell. |
| VMGM_CP_EA- | end address of last VOBU in cell. |
| VMGM_VOBU_ADA MAP_EA- | end address of video manager menu video object unit address map |
| VMGM_VOBU_SA- | start address of VOB. |

Figure 2:
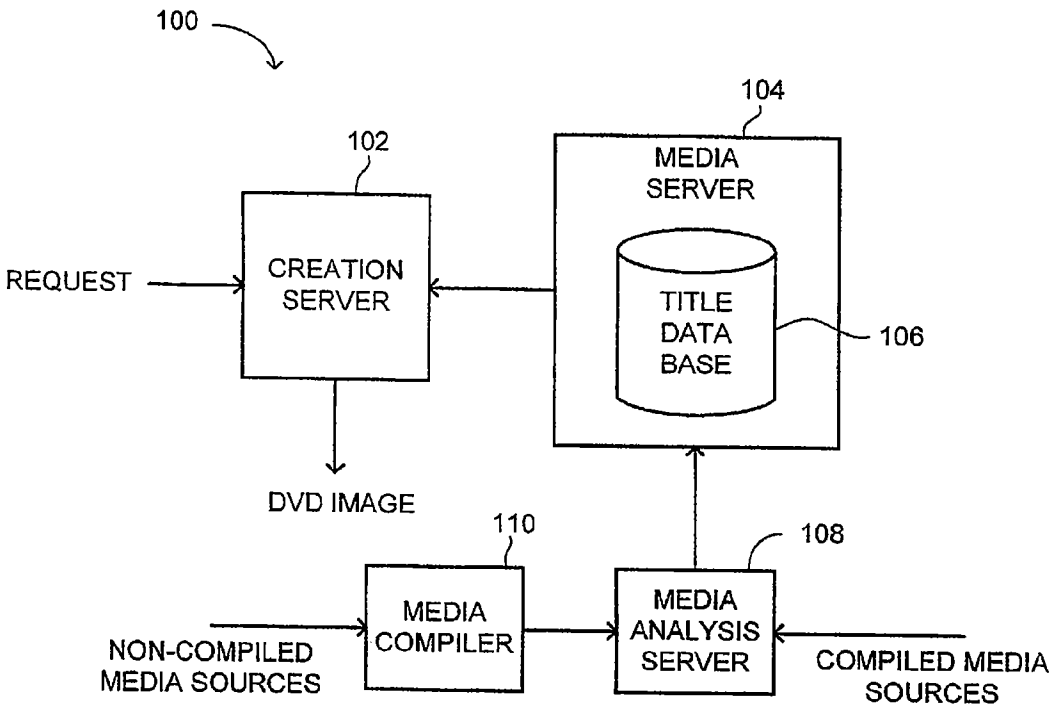
FIG. 2 is a schematic illustration of a system, constructed and operative in accordance with a preferred embodiment of the present invention.
Figure 3:
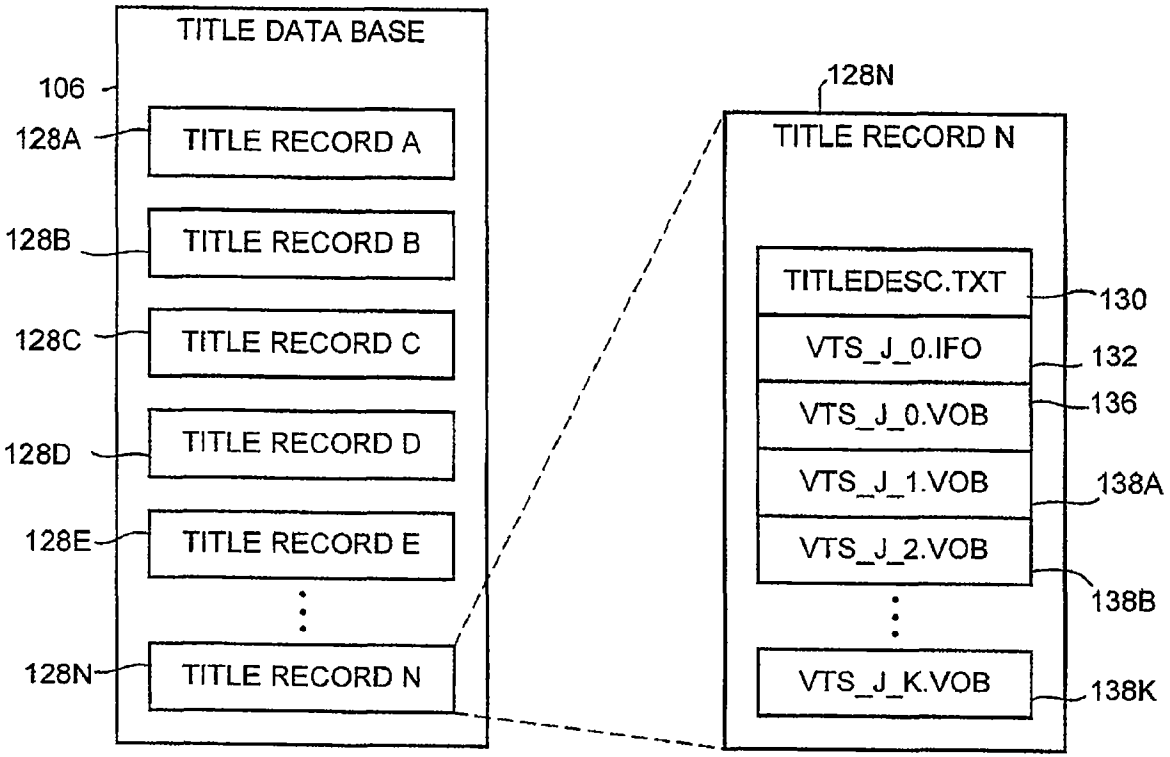
FIG. 3 is a schematic illustration of the title database of the system of FIG. 2.
Figure 4:
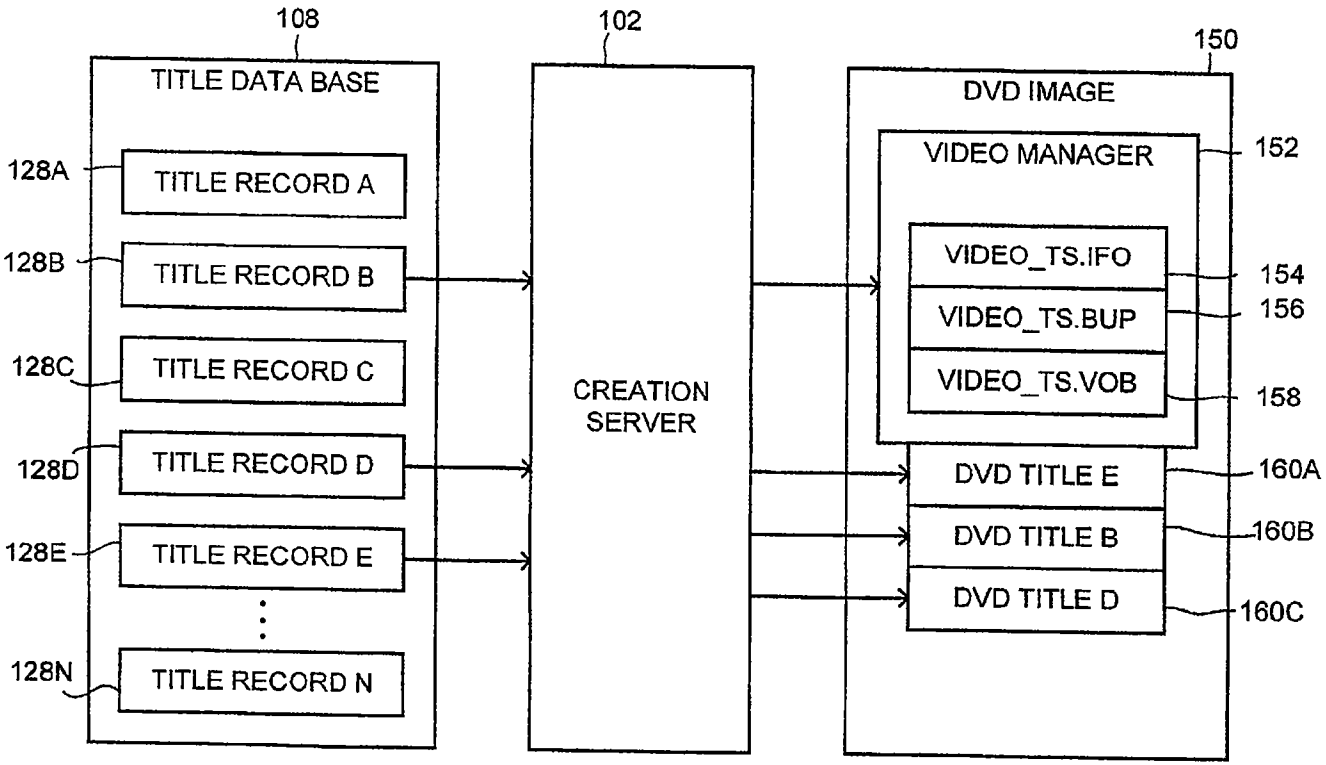
FIG. 4 is a schematic illustration of the flow of data in the system of FIG. 2, while creating a DVD image.

Reference is now made to FIGS. 2, 3 and 4. FIG. 2 is a schematic illustration of a system, generally referenced 100, constructed and operative in accordance with a preferred embodiment of the present invention. FIG. 3 is a schematic illustration of a title database 106, of FIG. 2. FIG. 4 is a schematic illustration of the flow of data in system 100 of FIG. 2, while creating a DVD image.

With reference to FIG. 2, system 100 includes a creation server 102, a media server 104, a media analysis server 108 and a media compiler 110. Creation server 102 is coupled to media server 104. Media analysis server 108 is coupled to media compiler 110 and to media server 104. Media server 104 includes a title database 106.

Media analysis server 108 receives a plurality of compiled media sources, analyzes them, produces a media record (e.g., a title record, a cell record or a pointer record) and stores these media records in title database 106. Each of the media records includes an informative section, which relates to the results of the analysis, and a copy of the analyzed media module. The example set forth in FIGS. 3 and 4 relates to a situation where the media modules are multimedia titles (i.e., include both audio and visual data).

System 100 can also operate on non-compiled media sources, which are received at the input of media compiler 110. Media compiler 110 compiles a non-compiled media module (e.g., a title or a clip) into DVD format and provides the compiled media module to media analysis server 108.

Creation server 102 receives a request to produce a DVD image from a plurality of titles available in title database 106. Creation server 102 accesses title database 106, retrieves the respective title records and produces a DVD image, as will be described herein below.

With reference to FIG. 3, title database 106 includes a plurality of title records 128A, 128B, 128C, 128D, 128E and 128N. The structure of these title records N is unique to the disclosed technique. For example, title record 128N includes a TITLEDESC.TXT file 130, a VTS_J__0.IFO file 132, a VTS_J__0.VOB file 136 and a plurality of files VTS_$J_{13}$1.VOB, VTS_$J_{13}$2.VOB and VTS_J_K.VOB, referenced 138A, 138B and 138K, respectively. It is noted that VTS_$J_{13}$0.BUP file 134 is a mere backup copy of VTS_$J_{13}$0.IFO file 132 and hence is redundant. Accordingly, VTS_$J_{13}$0.BUP file 134 can always be restored from VTS_$J_{13}$0.IFO file 132 simply by copying it and renaming the copy file with a BUP suffix.

VTS_J__0.IFO file 132, VTS_J__0.VOB file 136 and VOB files 138A, 138B and 138K comprise a compiled DVD title. TITLEDESC.TXT file 130 contains the analysis results of that DVD title.

The following is a brief description of the structure of TITLEDESC.TXT file 130. According to one aspect of the invention, a plurality of template VIDEO_TS.IFO files are created in advance, one for each number of title selections (i.e., a VIDEO_TS.IFO for a selection of a single title for the DVD image, a VIDEO_TS.IFO for a selection of two titles, a VIDEO_TS.IFO file for a selection of three titles, and the like). Each of these template VIDEO_TS.IFO files includes template menu (MENU_DESC) and template titles (TTL_DESC) as described in the following tables 1 and 2.

TABLE 1

(TTL_DESC)

| Field name | Place in VTS_X_0_IFO | Size in bytes | Description |
|---|---|---|---|
| VTS_EA | 12 | 4 | Size of the Entire Title |
| VTS_CAT | 34 | 4 | Vts Category |
| VTS_ATTRIBUTE | 256 | 768 | Vts Attribute |
| VTS_PTT_SRPT | (200-204)×2048 | 2 | Part of Titles number (Title can be a set of X part of titles). |

TABLE 2

(MENU_DESC)

| Field name | Size (bytes) | Description |
|---|---|---|
| VOB_EA | 4 | Size of VOB of the menu in RLBN (bn = 2048 bytes) |
| C_LVOBU_SA | 4 | Start address of the last VOBU in the menu cell |
| C_LVOBU_EA | 4 | End address of the last VOBU in the menu cell |

The following parameters are required for modifying the VIDEO_TS.IFO file:

Number of titles, which are selected for the DVD image.

The order of the selected titles on the DVD image.

The path for each of the title directories.

The definitions of the menu files (VOB and MENU_DESC).

The identification of the template file, which is to be modified.

The modification of the template file is described in Table 3, as follows:

TABLE 3

| Parameter | Pointer in VIDEO_TS file | Pointer size (bytes) | Description |
|---|---|---|---|
| VMGI_EA | 28 | 4 | End Address of VMGI |
| VMGM_VOBS_SA | 192 | 4 | Start address of VMG_VOBS |
| TT_SRPT_SA | 196 | 4 | Start Address of TT_SRPT |
| VMGM_PGCI_UT_SA | 200 | 4 | Start address of VMGM_PGCI_UT |
| VTS_ATRT_SA | 208 | 4 | Start address of VTS_ATRT |
| VMGM_C_ADT_SA | 216 | 4 | Start address of VMGM_C_ADT |

The modifications are performed in the following blocks:

TABLE 4

(VMGI Block)

| Modified Parameter | Pointer in VIDEO_TS file | Value |
|---|---|---|
| VMG_EA | (12) | VMGI_EA×MENU_DESC (VOB_EA)+24 bytes long |

TABLE 5

(Title Search Block)

| Modified Parameter | Pointer in VIDEO_TS file | Value |
|---|---|---|
| PTT_Ns of title i | (TT_SRPT_SA)+10+[12×[i−1]] | VTS_PTT_SRPT #i 2 bytes long |
| VMG_EA | (TT_SRPT_SA)+10+[12×[i−1]] | Menu Size + Previous Title size + 1 4 bytes long |

Where the menu size is equal to the value of MENU_DESC (VOB_EA) and the previous title size is equal to the sum of all of the previous TTL_DESC(VTS_EA). ( ) denotes a pointer to a value.

TABLE 6

(Video Manager Menu PGCI Block)

| Modified Parameter | Pointer in VIDEO_TS file | Value |
|---|---|---|
| C_LVOBU_SA | ((VMGM_PGCI_UT_SA+16+232+16)) | MENU_DESC (C_LVOBU_SA) 2 bytes long |
| C_LVOBU_EA | ((VMGM_PGCI_UT_SA+16+232+20)) | MENU_DESC (C_LVOBU_EA) 2 bytes long |

Where (( )) denotes a pointer to a pointer to a value.

TABLE 7

(Video Title Set Attribute)

| Modified Parameter | Pointer in VIDEO_TS file | Value |
|---|---|---|
| VTS_CAT#i | ((VTS_ATRT_SA+8+4×[i−1]))+4 | TTL_DESC#i (VTS CAT) 4 bytes long |
| VTS_ATRI#i | ((VTS_ATRT_SA+ 8+ 4×[i−1]))+8 | TTL_DESC#i (VTS_CAT) 4 bytes long |

TABLE 8

(Video Manager Menu Cell Address)

| Modified Parameter | Pointer in VIDEO_TS file | Value |
|---|---|---|
| VMGM_CP_EA | (VMGM_C_ADT_SA)+16 | MENU_DESC (C_LVOBU_EA) 4 bytes long |

With reference to FIG. 4, creation server 102 receives a request to produce a DVD image, which includes the DVD titles B, D and E, respectively embedded in title records 128B, 128D and 128E. The order of the titles in the final DVD image is to be DVD title E first, DVD title B second and finally DVD title D.

Creation server 102 accesses title database 106 (FIG. 2) and retrieves the TITLEDESC.TXT files of DVD records 128B, 128D and 128E. Creation server 102 processes the title analysis information stored in the TITLEDESC.TXT files and produces VIDEO_TS.IFO file 154 and VIDEO_TS.BUP file 156, which is a copy thereof. VIDEO_TS.IFO file 154 includes DVD image management commands and information, which are used to receive instruction from a user and access each of the titles in the final DVD image. In addition, creation server 102 produces VIDEO_TS.VOB file 158, according to predetermined rules and templates, which may take into consideration the nature of the requested DVD titles. For example, a selection of war movies may yield a VIDEO_TS.VOB file, which includes video representation of combat elements, and a selection of nature DVD titles may yield a VIDEO_TS.VOB file which includes video representation of wild life elements.

VIDEO_TS.IFO file 154 together with VIDEO_TS.BUP file 156 and VIDEO_TS.VOB file 158 form a DVD video manager section 152 of a later produced DVD image. Creation server 102 produces the final DVD image 150 from DVD video manager section 152 and from the selected DVD titles, as retrieved from the respective title records 128B, 128D and 128E. DVD image 150 includes VIDEO_TS.IFO file 154, VIDEO_TS.BUP file 156, VIDEO_TS.VOB file 158 and DVD titles 160A, 160B and 160C. DVD titles 160A, 160B and 160C are respective copies of the DVD titles embedded in title records 128B, 128D and 128E. It is noted that creation server 102 does not compile any of these titles in the process of producing DVD image 150. The titles are merely attached to the final DVD image, after the video manager section 152, which is produced according to preliminary analysis thereof.

Figure 5:
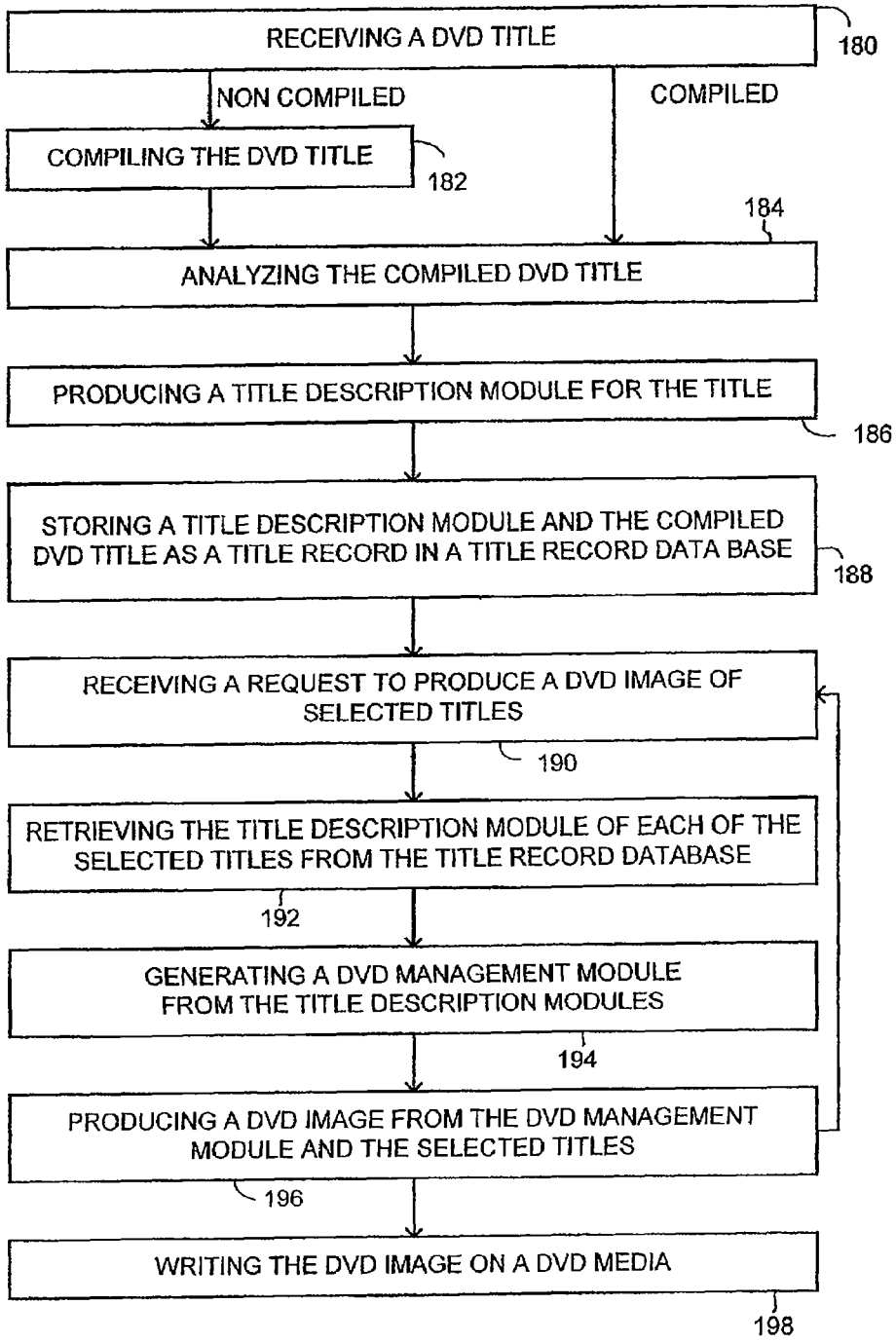
FIG. 5 is an illustration of a method for operating the system of FIG. 2, operative in accordance with another preferred embodiment of the present invention.

Reference is now made to FIG. 5, which is an illustration of a method for operating system 100 of FIG. 2, operative in accordance with another preferred embodiment of the present invention. In step 180, a DVD title is received. With reference to FIG. 2, a compiled DVD title is received directly to media analysis server 108 and a non-compiled DVD title is received at media compiler 110, which compiles it to DVD title format (step 182).

In step 184, the compiled DVD title is analyzed. The analysis is directed at detecting various characteristics of the compiled DVD title, such as the internal file structure and the internal media cell structure in terms of size and displacement, the content of the DVD title, according to analysis of subtitle streams of voice analysis of the audio streams, and the like. With reference to FIG. 2, media analysis server 108 analyzes the DVD title and produces a title description module (step 186).

In step 188, the title description module and the compiled DVD title are stored as a title record in title record database. The title record structure enables individual access to each of the title description modules and the compiled DVD titles. With reference to FIG. 2, media analysis server 108 generates a title record from the title description module and the compiled DVD title and stores the title record in title database 106.

In step 190, a request to produce a DVD image of selected titles, is received. With reference to FIG. 2, creation server 102 receives a request to produce a DVD image of titles, which are embedded in title records, and stored in title database 106.

In step 192, the title description module associated with each of the selected lilies is retrieved from the respective title record, in the title database. With reference to FIG. 2, creation server 102 retrieves the TITLEDESC.TXT modules from each of the selected title records using a query, which is directed to media server 104.

In step 194, a DVD management module is generated from the retrieved title description modules. With reference to FIG. 4, creation server 102, produces video manager section 152 including VIDEO_TS.IFO file 154, VIDEO_TS.BUP file 156 and VIDEO_TS.VOB file. 158.

In step 196, a DVD image is produced from the DVD management module and the selected titles. With reference to FIG. 4, creation server 102 produces DVD image 150 from DVD manager section 152 and from titles 160A, 160B and 160C, which are copies of the selected titles. It is noted that the creation server 102 can produce the DVD image directly in media server 104, by storing DVD management module in media server 104, together with copies of the selected DVD titles. This way, the copy procedure of the titles, which involves mass volumes of data, is performed within the media server and not over communication lines, which are typically slower than internal communication channels, within the media server.

In step 198, the DVD image is printed onto a DVD media. With reference to FIG. 2, creation server provides the DVD image to a DVD printing device (not shown). It is noted that the DVD printing device can be also coupled to the media server 104, which stores the DVD image.

Figure 6:
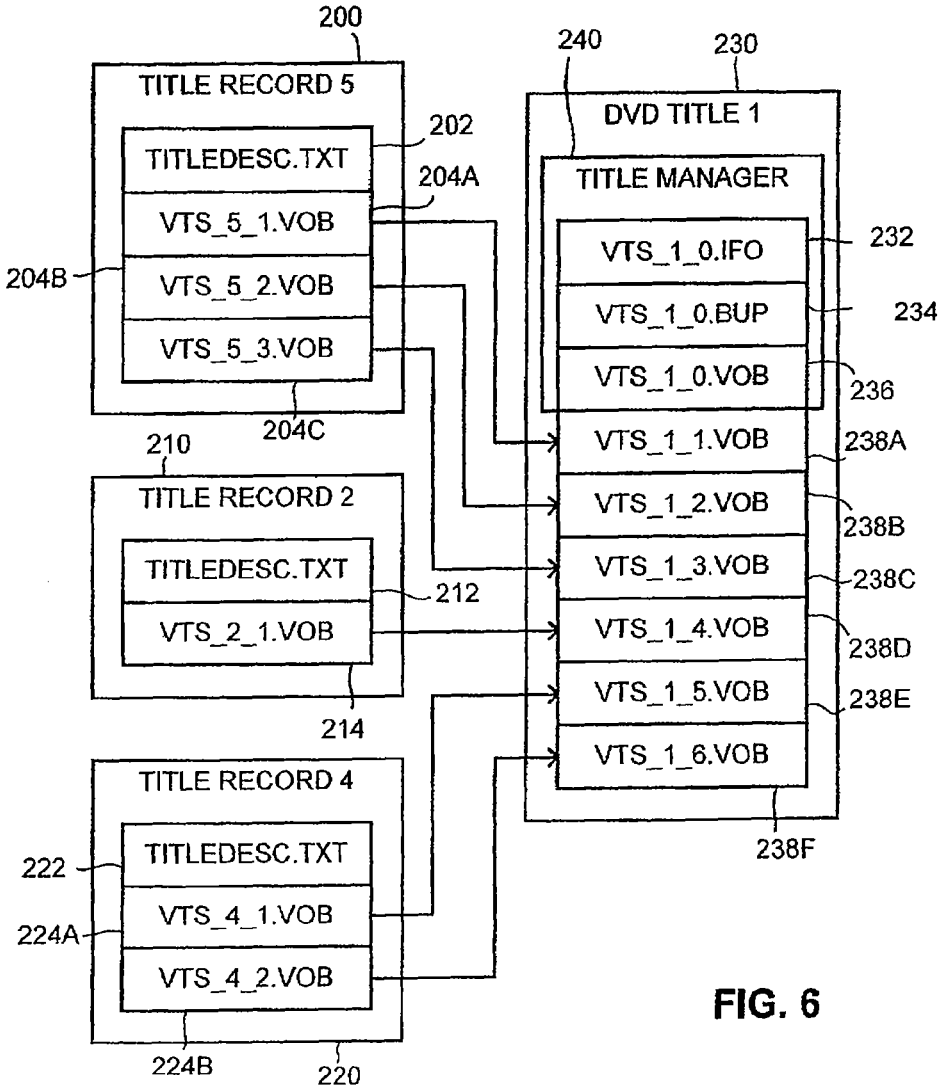
FIG. 6 is a schematic illustration of the flow of data in the system of FIG. 2 according to a further preferred embodiment of the present invention.

Reference is now made to FIG. 6, which is a schematic illustration of the flow of data in system 100, according to a further preferred embodiment of the present invention. According to this aspect of the invention, a plurality of titles is combined into a new title. In the example set forth in FIG. 6, three DVD titles embedded in three DVD records 200, 210 and 220 are combined into a new DVD title 230.

DVD record 200 includes a TITLEDESC.TXT file 202 and three VOB files VTS_5_1.VOB, VTS_5_2.VOB and VTS_5_3.VOB, referenced 204A, 204B and 204C, respectively. DVD record 210 includes a TITLEDESC.TXT file 212 and a single VOB file VTS_2_1.VOB, referenced 214. DVD record 220 includes a TITLEDESC.TXT file 222 and two VOB files VTS_4_1.VOB and VTS_4_2.VOB, referenced 224A and 224B, respectively.

The new DVD title 230 includes a VTS_1_0.IFO file 232, a VTS_1_0.BUP file 234, a VTS_1_0.VOB file 236 and a plurality of VOB files VTS_1_1.VOB, VTS_1_2.VOB, VTS_1_3.VOB, VTS_1_4.VOB, VTS_1_5.VOB and VTS_1_6.VOB, referenced 238A, 238B, 238C, 238D, 238E, and 238F, respectively. VOB files 238A, 238B, 238C, 238D, 238E, and 238F are respective copies of VOB files 204A, 204B, 204C, 214, 224A and 224B.

Creation server 102 (FIG. 2) produces files VTS_1_0.IFO file 232, a VTS_1_0.BUP file 234 and VTS_1_0.VOB file 236 according to TTTLEDESC.TXT files 202, 212 and 222, respectively, thereby forming the title manager section 240 of the new DVD title. Creation server 102 further modifies the names of VOB files 204A, 204B, 204C, 214, 224A and 224B and attaches copies thereof thereafter. The modified VOB file names form a sequence. It is noted that the number of VOB files cannot exceed twelve. To qualify this limitation, creation server 102 can further combine VOB files, as shall further be described further below.

Figure 7:
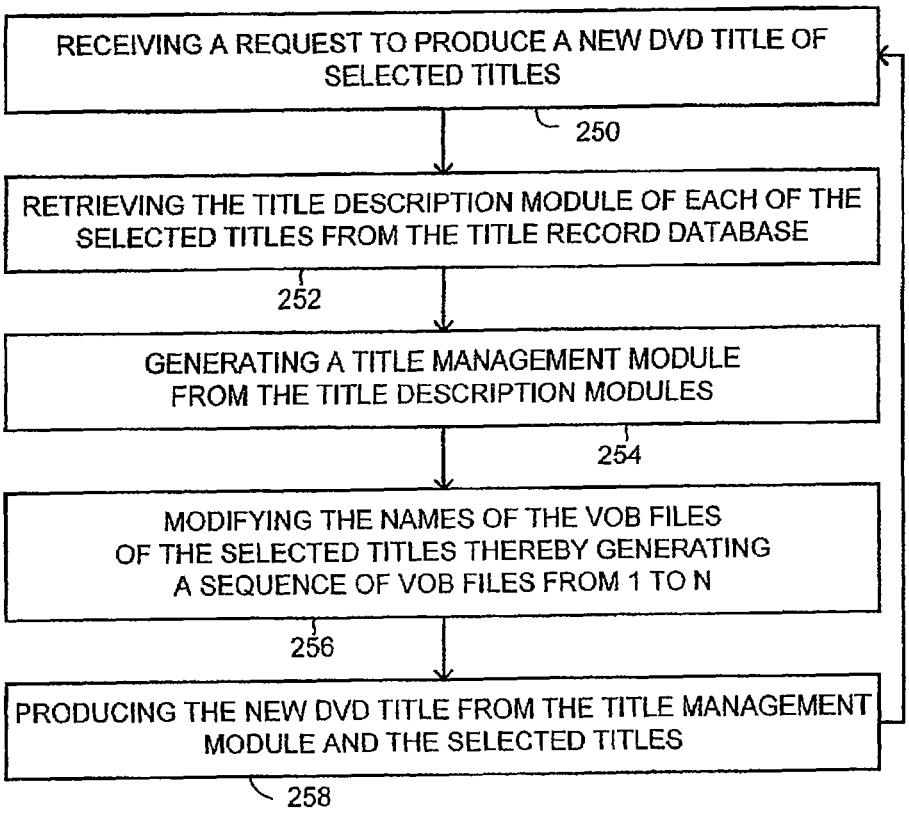
FIG. 7 is an illustration of a method for operating system 100 of FIG. 2, for achieving the flow of FIG. 6, operative in accordance with another preferred embodiment of the present invention.

Reference is now made to FIG. 7, which is an illustration of a method for operating system 100 of FIG. 2, for achieving the flow of FIG. 6, operative in accordance with another preferred embodiment of the present invention.

In step 250, a request to produce a new DVD title of selected titles, is received. With reference to FIG. 2, creation server 102 receives a request to produce a new DVD title from titles, which are embedded in title records, stored in title database 106.

In step 252, the title description module associated with each of the selected titles is retrieved from the respective title record, in the title database. With reference to FIG. 2, creation server 102 retrieves the TITLEDESC.TXT modules from each of the selected title records using a query, which is directed to media server 104.

In step 254, a title management module is generated from the retrieved title description modules. With reference to FIGS. 2 and 6, creation server 102, produces title manager section 240 which includes VTS_1_0.IFO file 232, VTS_1_0.BUP file 234 and VTS_1_0.VOB file 236.

In step 256, the names of the VOB files of the selected titles are modified so as to form a sequence of VOB files, starting at 1 to N (i.e., N is defined according to the total number of VOB files, which are not included in the title management sections of each of the selected titles). With reference to FIGS. 2 and 6, creation server 102 forms copies of the VOB files of the selected titles and modifies their names to form a sequence for the new DVD title.

In step 258, a new DVD title is produced from the newly generated title management module and the VOB files of the selected titles. With reference to FIG. 2 and 6, creation server 102 produces new DVD title 230 from title manager section 240 and from VOB files 238A, 238B, 238C, 238D, 238E, and 238F, which are modified name copies of the VOB files of the selected titles. Similar to the method presented in FIG. 5, here too, the creation server 102 can produce the new DVD title directly in media server 104, by storing title management module in media server 104, together with copies of the VOB files of the selected DVD titles.

This new DVD title can be now used for producing DVD images or storing in title database 106 together with a respective TITLEDESC.TXT file, as a title record.

Figure 8:
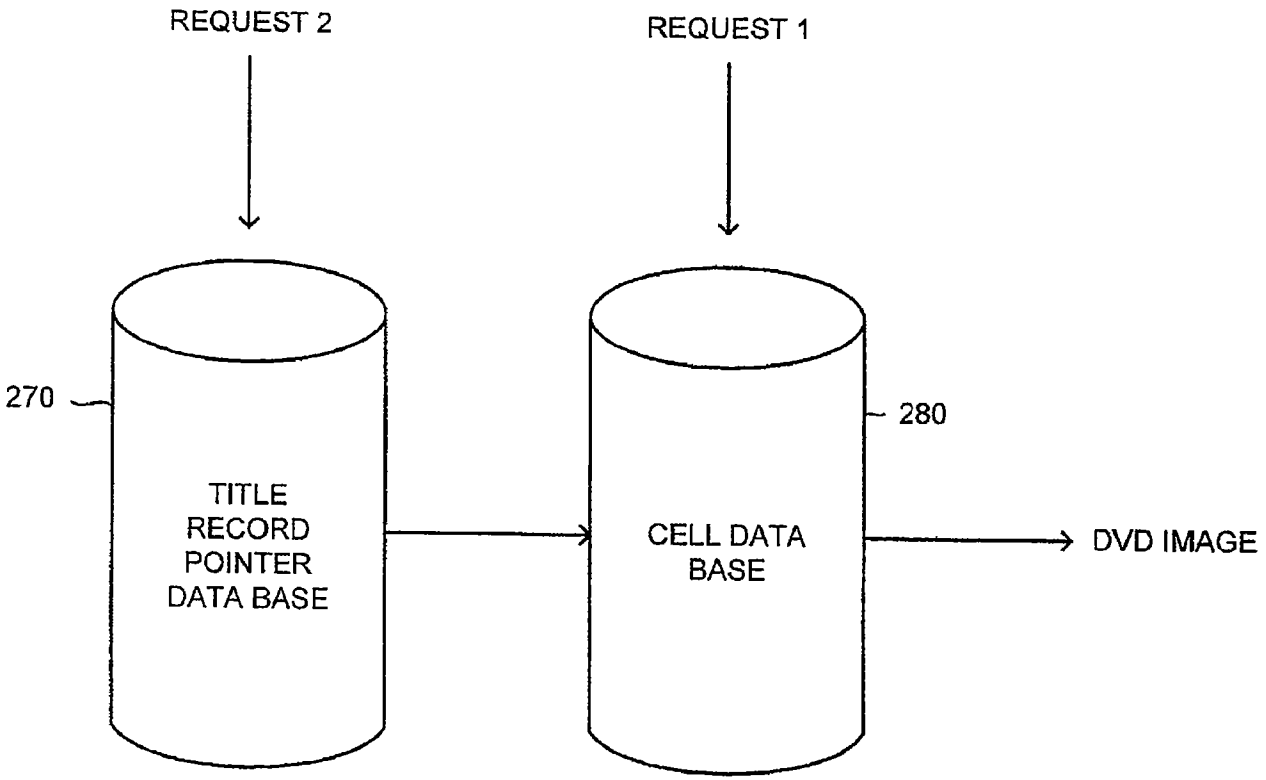
FIG. 8 is an illustration of a database structure, constructed and operative in accordance with a further preferred embodiment of the present invention.
Figure 9:
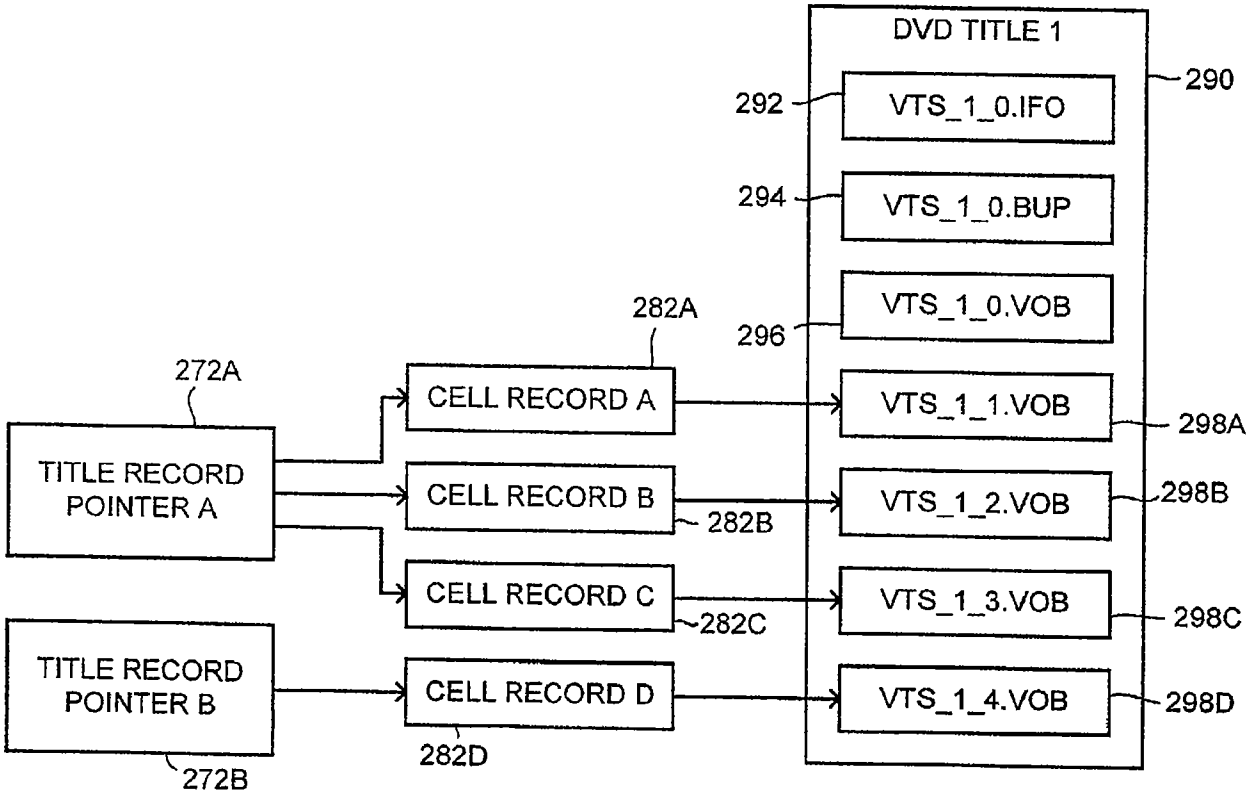
FIG. 9 is a schematic illustration of the flow of data in the system of FIG. 2, according to another preferred embodiment of the present invention.

According to another aspect of the invention, a DVD image is generated from a plurality of cells, which may or may not be associated with a DVD title. According to this aspect of the invention, a new DVD title can be generated from a plurality of cells, without requiring a stage of compilation. Reference is now made to FIGS. 8 and 9. FIG. 8 is a schematic illustration of a database structure, constructed and operative in accordance with a further preferred embodiment of the present invention. FIG. 9 is a schematic illustration in detail of the flow of data in a system 100 (FIG. 2), operating on the database structure presented in FIG. 8.

Cell database 280 includes a plurality of cell records, where each cell record includes a TITLEDESC.TXT file and at least one VOB file. Title record pointer database 270 includes a plurality of title pointer records, each pointing at at least one cell record within cell database 280. Each of the title records includes a TITLEDESC.TXT file and at least one cell pointer.

For example, each scene in a title can be encapsulated within a cell record and stored in cell database 280. The user can submit a request for a selection of scenes of a predetermined type (e.g., love scenes). In that case, the system shall produce a DVD image, which includes a plurality of love scenes. System 100 can arrange each cell record in the final DVD image, as an individual title, or it can combine a plurality of cell records into a new DVD title, as shall be described herein below.

Alternatively, the user can submit a request to produce a DVD image of a selected title. In that case, system 100 shall access title pointer database 270 and retrieve the respective title pointer record. System 100 retrieves cell records from cell database 280, according to the pointers included in that title pointer record. Finally, system 100 produces a DVD image, which includes all of the cells associated with the requested title. It is noted that the title pointer record can further include title management files, which are respective of the entire title but have no relevance to each individual cell. Hence, system 100 can make use of these title management files, in the process of generating the final DVD image.

With reference to FIG. 9, there is illustrated a case wherein the user submits a request for combining two titles. The title record pointers 272A and 272B are respective of these two requested titles. Title record pointer 272A points to three cell records 282A, 282B and 282C. Title record pointer 272B points to a single cell record 282D. System 100 (FIG. 2) generates a DVD title 290, which includes a VTS_1_0.IFO file 292, a VTS_1_0.BUP 294 and a VTS_1_0.VOB file 296 and a plurality of VTS_1_i.VOB, files 298A, 298B, 298C and 298D. Each of the VTS_1_1.VOB, VTS_1_2.VOB, VTS_1_3.VOB and VTS_1_4. VOB files is retrieved from the respective cell record 282A, 282B 282C and 282D and renamed according to the place thereof in the sequence.

Figure 10:
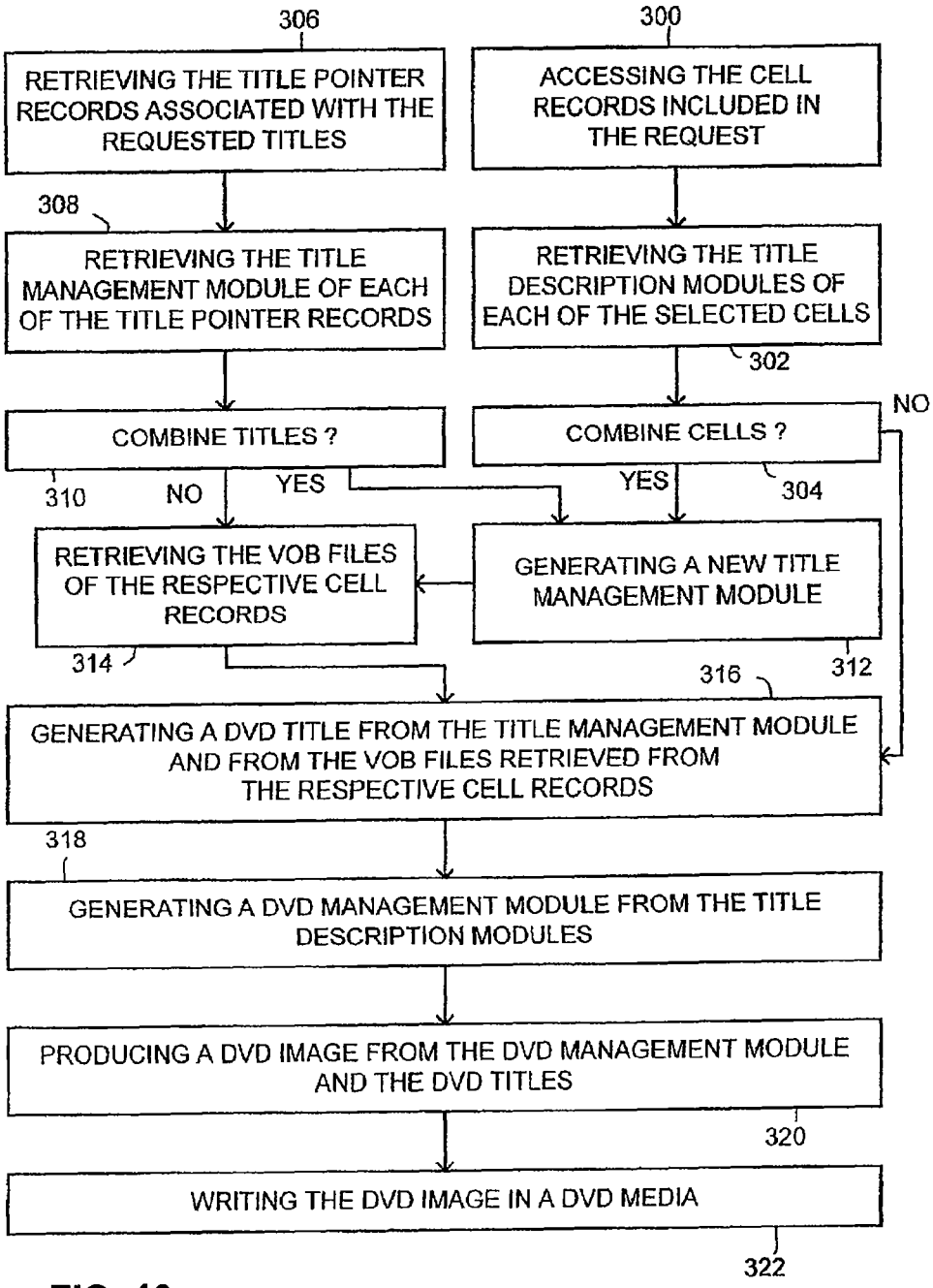
FIG. 10 is an illustration of a method for operating system 100 of FIG. 2, for achieving the flow of FIG. 8, operative in accordance with a further preferred embodiment of the present invention.

Reference is further made to FIG 10, which is an illustration of a method for operating system 100, operative in accordance with another preferred embodiment of the invention. In step 300 a plurality of cell records is accessed according to a received request. It is noted that the request can be received from a user or from an automatic system (e.g., according to predicted market needs). With reference to FIGS. 2 and 8, system 100 accesses cell database 280 and accesses the respective cell records and retrieves the cell description modules of each of the selected cells (step 302). In step 304, the request is analyzed to determine if cells have to be combined. If so, then system 100 proceeds to step 312. Otherwise, system 100 proceeds to step 316.

In step 306 a plurality of title pointer records is accessed according to a received request. Again, the request can be received from a user or from an automatic system (e.g., according to predicted market needs). With reference to FIGS. 2 and 8, system 100 accesses the respective title pointer records in title record pointer database 270 and retrieves the title management modules of each of the selected title pointer records (step 308). In step 310, the request is analyzed to determine if cells have to be combined. If so, then system 100 proceeds to step 312. Otherwise, system 100 proceeds to step 314.

In step 312, a new title management module is generated according to information provided by earlier retrieved management modules. It is noted that cells can be combined on a block level, as shall be further described in conjunction with FIGS. 11 and 12.

In step 314, the VOB files of the respective cell records are retrieved. As mentioned above, the cell records are accessed according to a specific request or according to pointers included in a requested title pointer record.

In step 316, a DVD title is generated from the title management module and from the retrieved VOB files. The title management module is either retrieved unchanged from a title pointer record, in the case that a title is requested as a whole, or generated as described in the above step 312. Subsequently, a DVD management module is generated from the title description modules (step 318), a DVD image is generated from DVD management modules and from the title description modules (step 320) and is written on a DVD media (step 322).

Figure 11:
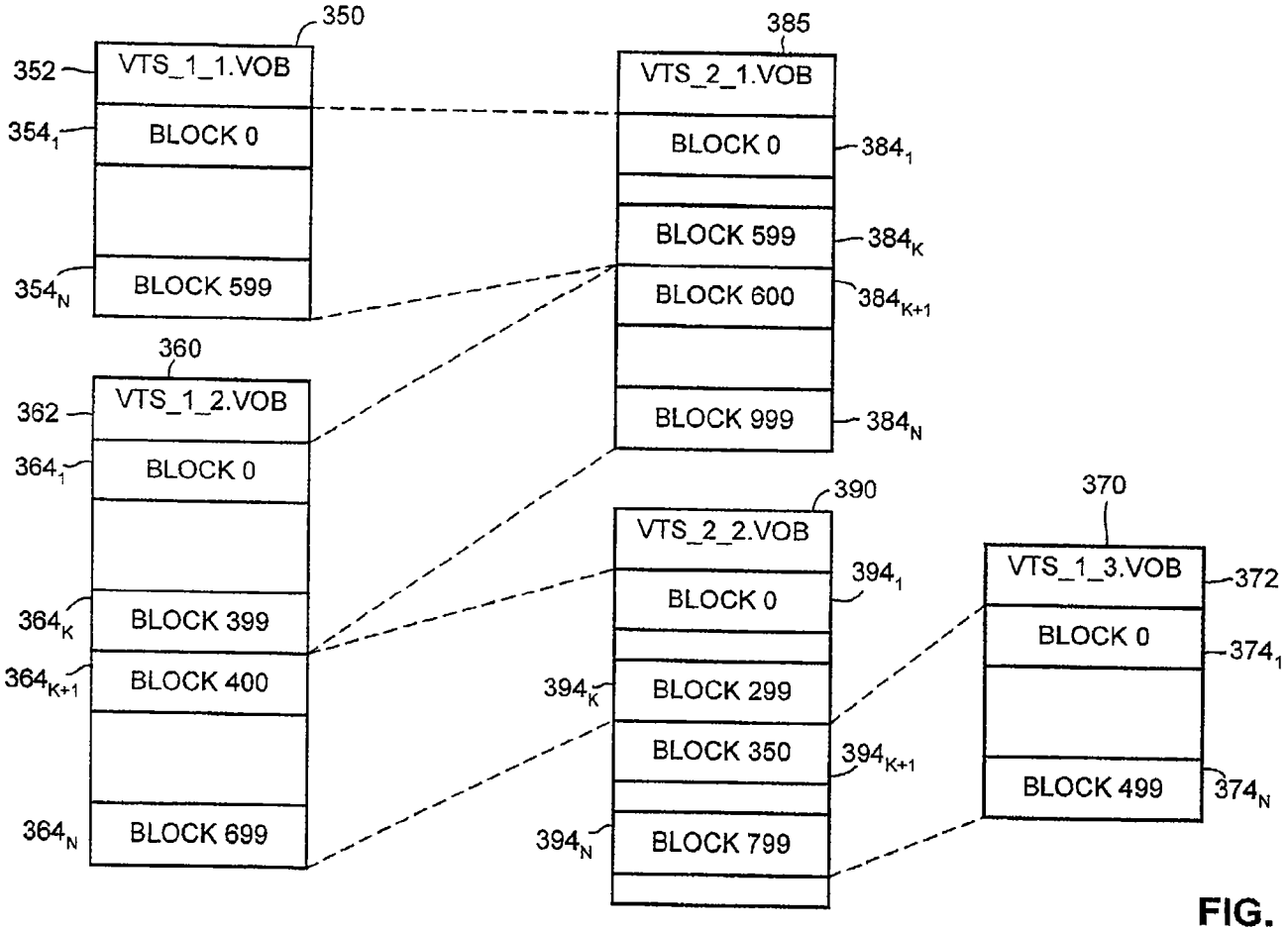
FIG. 11 is an illustration of a method for operating system 100 of FIG. 2, for achieving the flow of FIG. 8, operative in accordance with another preferred embodiment of the present invention.

According to a further aspect of the invention, system 100 can combine or break apart VOB files. Reference is further made to FIG. 11, which is an illustration of a VOB restructuring process, in accordance with a further preferred embodiment of the present invention. The files which are to be processed are VTS_1_1.VOB 350, VTS_1_2.VOB 360 and VTS_1_3.VOB 370.

System 100 (FIG. 2) combines all of the six hundred blocks of VTS_1_1.VOB 350 and the first four hundred blocks of VTS_1_2.VOB 360 into a new VTS_2_1.VOB file 385. All of the six hundred blocks $\mathbf{354}_1$-$\mathbf{354}_N$ of the VTS_1_1.VOB file 350 are placed as is, at the beginning of VTS_2_1.VOB 385 as $\mathbf{384}_1$-$\mathbf{384}_K$. The first four hundred blocks $\mathbf{364}_1$-$\mathbf{364}_K$ of the VTS_1_2.VOB file 360 are placed right after blocks $\mathbf{384}_1$-$\mathbf{384}_K$, as blocks $\mathbf{384}_{K+1}$-$\mathbf{384}_N$ and are renumbered front 600-999 to continue the sequence of blocks $\mathbf{384}_1$-$\mathbf{384}_K$. System 100 accesses each and every one or these blocks $\mathbf{364}_1$-$\mathbf{364}_K$ and updates its address according to its new location in the sequence of blocks. The resulting VTS_2_1.VOB file 385 includes one thousand blocks, which can be played seamlessly.

In addition, system 100 (FIG. 2) combines the next thee hundred blocks of VTS_1_2.VOB 360 and all of the five hundred blocks of VTS_1_3.VOB 370 into a new VTS_2_2.VOB file 390. System 100 places the next thee hundred blocks $\mathbf{364}_{K+1}$-$\mathbf{364}_N$ of VTS_1_2.VOB 360 at the beginning of VTS_2_2.VOB file 390, as blocks $\mathbf{394}_1$-$\mathbf{394}_K$ and renumbers them to be from 0-299. System 100 places blocks $\mathbf{374}_1$-$\mathbf{374}_N$ right after blocks $\mathbf{394}_1$-$\mathbf{394}_K$, as blocks $\mathbf{394}_{K+1}$-$\mathbf{394}_N$ and renumbers them 350-799 to continue the sequence of blocks $\mathbf{394}_A$-$\mathbf{394}_K$. System 100 accesses each and every one of blocks $\mathbf{374}_1$-$\mathbf{374}_K$ and updates its address according to its new location in the sequence of blocks. The resulting VTS_2_2.VOB file includes eight hundred blocks, which can be played seamlessly.

Figure 12:
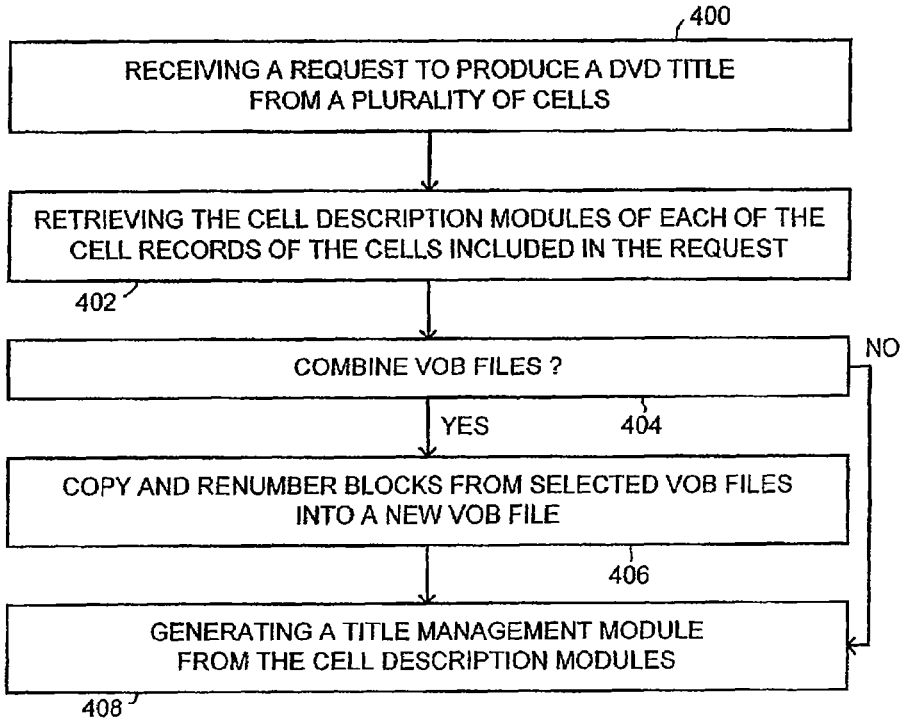
FIG. 12 is an illustration of a method for operating system 100, operative in accordance with a further preferred embodiment of the invention.

Reference is further made to FIG. 12, which is an illustration of a method for operating system 100, operative in accordance with another preferred embodiment of the invention. In step 400, a request to produce a DVD title from a plurality of cells is received. This request can be received specifically from a user or automatically during a title combining procedure. In step 402, the cell description modules of each of the cell records of the cells included in the request, are retrieved.

In step 404, the request is analyzed to determine if VOB files are to be combined. If so, then system 100 proceeds to step 406. Otherwise, system 100 proceeds from step 408.

In step 406, the blocks of the selected VOB files are copied and renumbered into a new VOB file, as detailed in FIG. 11. In step 408, a title management module is generated according to the cell description modules and the final structure of the new VOB files.

Figure 13:
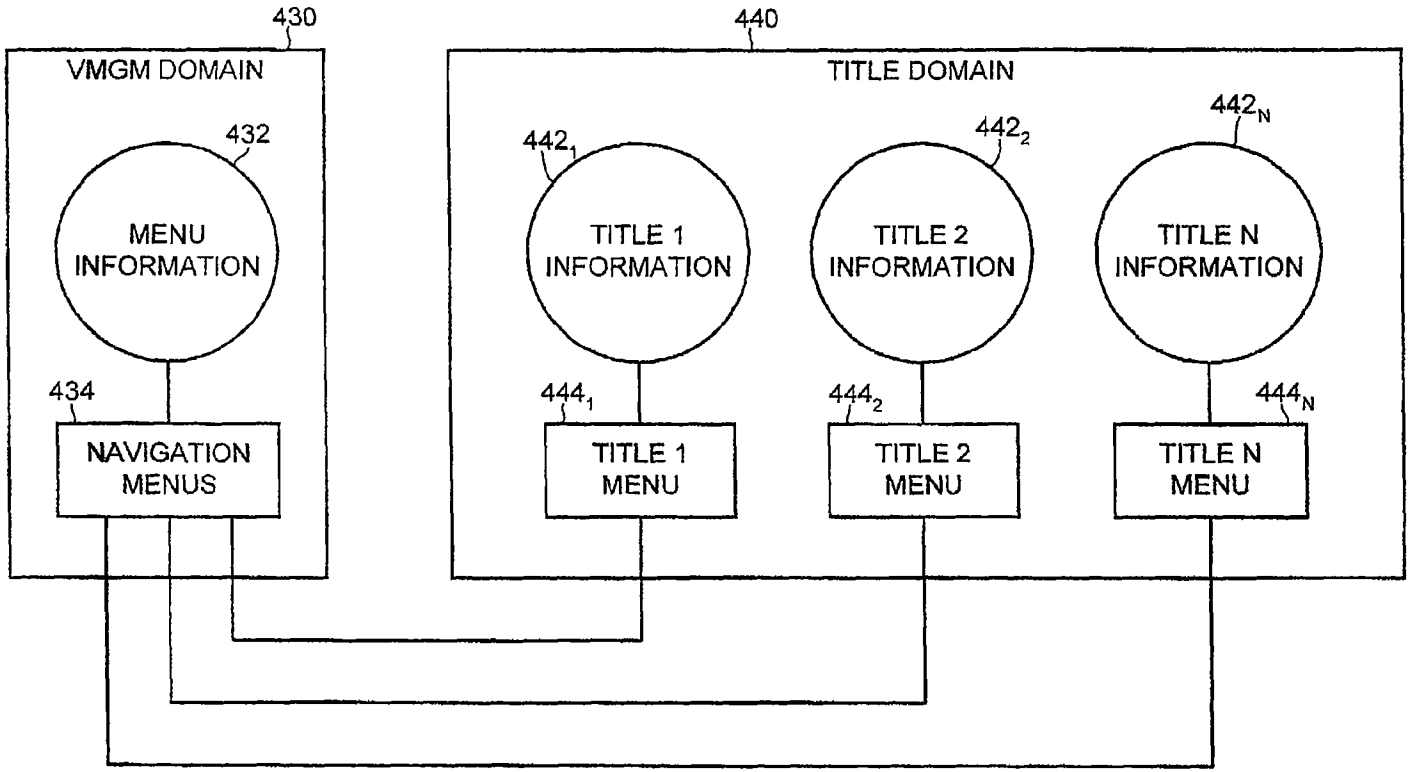
FIG. 13 is a schematic illustration of a DVD menu hierarchy, according to DVD format.

Reference is now made to FIG. 13, which is a schematic illustration of a DVD menu hierarchy, according to DVD format. In general, the DVD image includes a VMGM domain 430 and a title domain 440. The VMGM domain 430 is superior to the title domain 440 and is conventionally configured to play as the DVD media is inserted in the DVD player.

VMGM domain 430 includes a menu information section 432 and a navigation menus section 434. Title domain 440 includes a plurality (N) of title information sections $\mathbf{442}_1$, $\mathbf{442}_2$ and $^{442}{}_N$ and a plurality of title menus $\mathbf{444}_1$, $\mathbf{444}_2$ and $\mathbf{444}_N$. Title information sections $\mathbf{442}_1$, $\mathbf{442}_2$ and $\mathbf{442}_N$ are respectively associated to title menus $\mathbf{444}_1$, $\mathbf{444}_2$ and $\mathbf{444}_N$.

Navigation menus section 434 includes a plurality of pointers, each pointing to a selected one of title menus $\mathbf{444}_1$, $\mathbf{444}_2$ and $\mathbf{444}_N$. Hence, navigation menus section 434 provides a navigate scheme to the user, to navigate between the different titles on the DVD media. Each of title menus $\mathbf{444}_1$, $\mathbf{444}_2$ and $\mathbf{444}_N$ is operative to navigate within its respective title as well as to return to navigation menus section 434.

The following is a detailed description of a process for generating a multi-menu and multi-title DVD image. This process includes two phases. The first phase includes the making of one complete menu file from several templates. This file is used for navigating between the different titles in the DVD image. The second phase includes the making of an IFO file which describes the content of the DVD and provides the initial play commands, right at the insertion of the DVD disk into the DVD player. According to this aspect of the invention, the modifications are made in the files of the VMGM domain (video management section) 430 and not in the Title domain (title management sections) 440. Hence, the creation server processes a small amount of data and files for the purpose of manufacturing a custom DVD. The creation server operates on an existing template VMGM domain, changes and modifies specific sections therein and finally produces a DVD video library.

The following is a detailed description of how the creation server modifies a template VOB file of the template VMGM domain. In general, each of the template VOB files which is needed for the creation of the custom menu is first changed according to the DVD title content, as stored in the title description file and then chained to one VOB file which includes all of the menu information.

The creation server receives as input the VOB files of all of the different menus, which are edited in advance with the menu video information. The creation server inserts the navigation commands to the menu and merges the respective pages to one VOB file that provides a visual representation of the menu. Accordingly, the creation server receives a VOB file #1 respective of the menu of the first title, a VOB file #2 respective of the menu of the second title and so on, until VOB file #n, respective of the menu of the last (n) title.

The creation server performs four stages as follows:

In the first stage, the creation server processes each of the input title menus, extracts the sub-pictures embedded therein and produces a respective stand alone VOB file. This VOB file may have a plurality of pages, wherein each page can include links to several DVD titles.

In the second stage, the creation server modifies buttons in the NV_PACK section of the VMGM template so that each of these buttons points to a selected one of the titles. The following is an example of such modifications—30 02 00 00 00 0X 00 00, thereby yielding a jump command to title #X. Alternatively, the modifications can be set as follows:

jump SS is set to a value "30 06", vts_ttn is set to a value "00 01 0X"; and the vtsm domain root menu is set to a value "83 00 00", thereby yielding a jump command to the menu of title #X.

The addresses within the NV_PACK section, where these modifications should be introduced, are defined: (197+10i), where i=0, 1 . . . 31. The number of buttons can be set in the NV_PACK section, in address (158).

A presentation control information (PCI) table contains the navigation data to control the presentation of a VOB unit. A data search Information (DSI) table contains the navigation data to search and carry out Seamless playback of the VOB unit. The NV_PACK is a PACK of the VOB file (NV for navigation) the Pack contains two information tables, the PCI and the DSI. In the third stage, the creation server modifies the PCI, DSI tables in the NV_PACK section:

TABLE 9 pci_dsi Modification

| Displacement from beginning of NV_PACK | Description |
|---|---|
| 45 | The start address of VOB in RLBN. (size 4 bytes) |
| 1035 | The start address of VOB in RLBN (size 4 bytes) |
| 1055 | The menu serial number (01 first 02 second etc..) (size 2 bytes) |

In the fourth and final stage, the creation server chains all of the modified VOB files into one VOB file names Video_ts-.VOB.

The following is a detailed description of how the creation server changes and modifies the template IFO file of the template VMGM domain. The creation server produces a video_ts.IFO file from the titles that were custom selected by the user.

In general, for each number of title links and VMG links in the menu, the creation server has to come up with a plurality (n) of MENU_DESC modules and the same number (n) of page#i.VOB files. The following is a list of the input parameters, which the creation server receives as input for this purpose:

x title description modules, n menu description n page#i.vob files path where x denotes the number of titles that the user selected and n denotes the number of menus.

TABLE 10

Menu Description

| Field's Name | Size in bytes | Description |
|---|---|---|
| VOB_EA | 4 | Size of VOB of the menu in RLBN (BN = 2048 bytes) |

TABLE 10-continued

| Menu Description | | |
|---|---|---|
| Field's Name | Size in bytes | Description |
| C_LVOBU_SA | 4 | Start Address of last VOBU in Menu cell |
| C_LVOBU_EA | 4 | End Address of Last VOBU in Menu Cell |

In general, the menu description is an array, containing the above fields in a sorted order, wherein

OC_LVOBU_SA[1]=C_LVOBU_SA[1]

OC_LVOBU_EA[1]=C_LVOBU_EA[1], for i=1 and

OC_LVOBU_SA[i]=C_LVOBU_EA[i−1]+1+C_VOBU_SA[i]

OC_LVOBU_EA[i]=C_LVOBU_EA[i−1]+1+C_LVOBU_EA[i],

For i>1.

Total menu size=OC_LVOBU_EA[n]+1

VMGM_SIZE=Ceil{[32+8*(n−1)+266*(n−1)]/2048}

VTS_ATTR_SIZE=Ceil{[8+4*n+776*n]/2048}

An IFO file is constructed of blocks, wherein each block contains 2048 bytes. The table below denotes which bytes in these blocks need to be changed, their offset and their values. A normal definition will be created and these parameters will be modified due to the custom items that were chosen.

The video management file named video_ts includes the video manager general information (VMGI) table, which contains general information on the VMG file:

TABLE 11

| _VMGI_MAT | | | |
|---|---|---|---|
| Parameters to modify: | Pointer in Video_ ts file | Size of point-er in bytes | Value: |
| VMG_EA | 12 | 4 | (2+VMGM_SIZE+ VTS_ATRT_SIZE+ 2)*2+Total menu size+0x0F |
| VMGI_EA | 28 | 4 | End address of VMGI: 2+VMGM_S1ZE+VTS_ATRT_ SIZE+1 |
| VMGM_ | 192 | 4 | Start address of |

TABLE 11-continued

| _VMGI_MAT | | | |
|---|---|---|---|
| Parameters to modify: | Pointer in Video_ ts file | Size of point-er in bytes | Value: |
| VOBS_SA | | | VMG_VOBS: |
| TT_SRPT_ SA | 196 | 4 | Start address of TT_SRPT: 00 00 00 01 |
| VMGM_PGCI_ UT_SA | 200 | 4 | Start address of VMGM_PGCI_UT: 00 00 00 02 |
| VTS_ATRT_SA | 208 | 4 | Start address of VTS_ATRT: 2+VMGM_SIZE |
| VMGM_C_ ADT_SA | 216 | 4 | Start address of VMGM_C_ADT: 2+VMGM_SIZE+VTS_ATRT_ SIZE |
| VMGM_ VOBU_ ADMAP_SA | 220 | 4 | 2+VMGM_SIZE+ VTS_ATRT_SIZE+1 |

TABLE 12

| TT_SRPT (Title search pointer block) | | | | |
|---|---|---|---|---|
| Parameter to modify | Delta from TT_SRPT | Number of bytes | value | Description |
| TT_SRP_ Ns | 0 | 2 | x=number of titles | Number of title search pointers |
| Reserved | 2 | 2 | 00 00 | Reserved |
| TT_SRPT_ EA | 4 | 4 | 8+12*x−1 | End address of TT_SRPT |
| TT_PB_TY ANGLE_Ns | 8+12* [i−1] | 2 | 3C 01 | |
| PTT_NS | 10+12* [i−1] | 2 | VTS_PTT_S RPT#i | Number of part of title |
| TT_PTL_ ID_FLD | 12+12* [i−1] | 2 | 00 01 | |
| VTSN | 14+12* [i−1] | 1 | 1 | VTS number |
| VTS_TTN | 15+12* [i−1] | 1 | 01 | VTS title number |
| VTS_SA | 16+12* [i−1] | 4 | Menu size+previous titles' size+1 | Start address of VTS |
| Zeros staffing | 16+12* [x−1] | 2048 − TT_ SRPT_ EA | 00 | |

PGC Size=266

Lu pointer size=8

TABLE 13

| VMGM_PGCI_UT | | | | |
|---|---|---|---|---|
| Parameter to modify | Delta from VMGM PGCI_UT: | Number of bytes | Value | Description |
| (Video manager menu program chain information table) | | | | |
| VMGM_LU_Ns | 0 | 2 | 00 01 | Number of video manager menu language units |
| Reserved | 2 | 2 | 00 00 | Reserved |
| VMGM_PGCI_UT_ EA | 4 | 4 | 24 + (PGC Size + Lu pointer size)*n−1 | End address of VMGM_PCiCI LIT |
| VMGM_LCD | 8 | 2 | 65 6E | Video manager language code |

TABLE 13-continued

| VMGM_PGCI_UT | | | | |
|---|---|---|---|---|
| Parameter to modify | Delta from VMGM PGCI_UT: | Number of bytes | Value | Description |
| Reserved | 10 | 1 | 00 | |
| VMGM_EXST | 11 | 1 | 80 | VMGM existence |
| VMGM_LU_SA | 12 | 4 | 00 00 00 10 | Start address of VMGM_LU |
| Same comment | | | | |
| VMGM_PGCI_SRP_Ns | 16 | 2 | N | Number of VMGM_PGCI_SRPs |
| Reserved | 18 | 2 | 00 00 | |
| VMGM_LU_EA | 20 | 4 | VMGM_PGCI_UT_EA-16 | End address of VMGM_LU |
| VMGM_PGC_CAT | 24+8*(i−1) | 4 | First: 82 00 00 00 Other: 00 00 00 00 | VMGM_PGC category |
| VMGM_PGCI_SA | 28+8*(i−1) | 4 | 8+8*n+ PGC Size*(i−1) | Start address of VMGM_PGCI |
| Pgc#i | 32+8*(n−1)+ 266*(i−1) | 266 | See * | |
| Zero padding | 32+8*(n−1)+ 266*n | Ceil{[32+ 8*(n−1) + 266*(n−1)]/ 2048}* 2048− [32+8*(n− 1)+266* (n−1)] | 00 | |

The creation server modifies each of the program chain (pgc) the following places:

TABLE 14

| Displacement | Description |
|---|---|
| 246 | Start address of first VODU in the cell |
| 254 | Start address of last VOBU in the cell |

TABLE 14-continued

| Displacement | Description |
|---|---|
| 258 | End address of last VOBU in the cell |
| 262 | Menu number in the flow of the menus (length 2). |

TABLE 15

| VTS_ATRT (Video title set attribute table) | | | | |
|---|---|---|---|---|
| Parameter to modify | Delta from VMGM_ PGCI_UT: | Number of bytes | Value | Description |
| VTS_Ns | 0 | 2 | X | Number of VTSs |
| Reserved | 2 | 2 | 00 00 | |
| VTS_ATRT_EA | 4 | 4 | 8+4*x+ 776*x−1 | End address of VTS_ATTR |
| VTS_ATR_SA | 8+4*(i−1) | 4 | 8+4*x +776*(i−1) | |
| VTS_ATR_EA | 8+4*n+ 776*(i−1) | 4 | 00 00 03 07 | End address of VTS_ATR |
| VTS_CAT | 8+4*n+4+ 776*(i−1) | 4 | TTL_DESC#i (VTS_CAT) | Video title set category |
| VTS_ATR1 | 8+4*n+8+ 776(i−1) | 768 | TTL_DESC#i (VTS_ATTRIBUTE) | Video title set attribute table. |
| Zero padding | 8+4 * n+776*n | Ceil{[8+ 4*n+776*n]/ 2048)*2048−{8+4* n+ 776*n} | 00 | |

TABLE 16

| VMGM_C_ADT(Video manager menu cell address table) | | | | |
|---|---|---|---|---|
| Parameter to modify | Delta from VMGM_ PGCI_UT: | Number of bytes | Value | Description |
| VMGM_VOB_Ns | 0 | 2 | n | Number of VOBs in the VMGM_VOBS |
| Reserved | 2 | 2 | 00 00 | |
| VMGM_C_ADT_EA | 4 | 4 | 8+12*n−1 | End address of VMGM_C_ADT |
| VMGM_VOB_IDN | 8+12* (i−1) | 2 | VOB ID (00 01/00 02 . . .) | Vob id number |
| VMGM_C_IDN | 10+12* (i−1) | 1 | 01 | Cell ID number |
| Reserved | 11+12* (i−1) | 1 | 00 | |
| VMGM_CP_SA | 12+12* (i−1) | 4 | Start address of vob | |
| VMGM_CP_A | 16+12* (i−1) | 4 | End address of vob | |
| Zero padding | 16+12*n | 2048−(16+12*n) | 00 | |

TABLE 17

| VMGM_VOBU_ADMAP (Video manager menu video object unit address map) | | | | |
|---|---|---|---|---|
| Parameter to modify | Delta from VMGM_ PGCI_UT: | Number of bytes | Value | Description |
| VMGM_ VOBU ADAMAP_ EA | 0 | 4 | 4+4*n−1 | End address of VMGM VOBU_ ADMAP |
| VMGM_ VOBU SA | 4+4* (i−1) | 4 | Start address of vob | |
| Zero padding | 4+4*n | 2048−4+ 4*n | 00 | |

Finally, the creation server produces the DVD video library (directory) by the name of Video_ts, which includes the above modified Video_Ts.ifo and Video_Ts.vob files, a Video_Ts-.bup, which is a backup copy of the Video_Ts.ifo file and all of the VTS files respective of the selected titles.

It will be appreciated by persons skilled in the art that the present invention is not limited to what has been particularly shown and described hereinabove. Rather the scope of the present invention is defined only by the claims, which follow.

The invention claimed is:

1. Method for producing a DVD image including at least video, comprising the steps of:

receiving a request to produce a DVD image of selected titles, each said selected titles being associated with a previously compiled [version thereof] *DVD title*, at least one of said selected [tiles] *titles* being a video title;

retrieving a plurality of title description modules, *wherein* each *title description module is* associated with a selected one of said selected titles *and contains analysis results of that title*;

generating a DVD management module from said title description modules by modifying a DVD management module template, according to parameters extracted from said title description modules; and producing a DVD image from said DVD management module and from said compiled versions of said selected titles eliminating a title management section of all but a first of said selected titles;

modifying file numbers of VOB files of said all but the first of said selected titles to be in sequence with the VOB files of a first selected title; and modifying the title management section of said first selected title, to be associated with the renumbered VOB files of said all but the first of said selected titles.

2. Method for producing a single DVD title from a plurality of DVD titles, comprising the steps of:

providing a plurality of *previously compiled* DVD titles;

*retrieving a plurality of title description modules, wherein each title description module is associated with a selected one of said selected titles and contains analysis results of that title;* eliminating a title management section of all but a first of said *previously compiled* DVD titles;

modifying file numbers of the VOB files of said all but the first of said *previously compiled* DVD titles to be in sequence with the VOB files of the first *previously compiled* DVD title;

modifying the title management section of said first *previously compiled* DVD title, to be associated with both said first *previously compiled* DVD title and said all but the first of said *previously compiled* DVD titles in said provided *previously compiled* DVD titles.

3. The method according to claim 2, further comprising the step of:

merging selected ones of said VOB files and altering internal block addresses in said merged VOB files, to be in sequence there between.

4. Method for producing a DVD image from a plurality of *previously compiled* selected DVD video cell records and a plurality of video title pointer records, each of said selected DVD video cell records including a title description module and at least one cell content files, each of said video title pointer records including a title description module and pointers to at least one of said selected DVD video cell records, the method comprising the steps of:

receiving a user request including one of at least one video title pointer record and at least one cell record;

performing steps a, b, and c when said user request includes at least one video title pointer record and performing steps d, e, f and g when said user request includes at least one DVD video cell record:

a. retrieving the title management modules of each of said at least one video title pointer records;

b. generating a new title management module when certain ones of selected titles are to be combined; and c. retrieving the cell content files of the respective ones of said selected DVD video cell records associated with said requested at least one video title pointer record;

d. retrieving the title management modules of each of selected DVD video cell records; [and]

e. generating a new title management module and retrieving the cell content files of said respective DVD video cell records, when certain ones of said selected titles are to be combined;

f. generating at least one DVD title from said new title management module and from the respective ones of said retrieved cell content files, by associating said title management module and said respective ones of said retrieved cell content files; [and]

g. generating a DVD management module from said title description modules, *wherein each title description module is associated with a previously compiled DVD title and contains analysis results of that title; and*

*producing a DVD image from said DVD management module and from said generated DVD titles by eliminating a title management section of all but a first of the generated DVD titles, modifying file numbers of retrieved cell content files of the all but the first of the generated DVD titles to be in sequence with the retrieved cell content files of a first generated DVD title, and modifying the title management section of the first generated DVD title, to be associated with the renumbered retrieved cell content files of the all but the first of the generated DVD titles.*

[5. The method according to claim 4, further comprising the step of producing a DVD image from said DVD management module and from said generated DVD titles.]

6. The method according to claim 4, further comprising the step of writing said DVD image on a DVD media.

*7. A system, comprising:*

*a creation server configured to receive a request to produce a media image of selected previously compiled DVD titles at least one of the selected titles being a video title; and*

*a media server configured to store a plurality of title description modules in a title database, each of the plurality of title description modules associated with a respective one of the selected titles and containing analysis results of that title,*

*wherein the creation server further comprises,*

*retrieving the plurality of title description modules,*

*generating a management module from the title description modules, and*

*producing the media image from the management module and from the compiled versions of the selected titles by eliminating a title management section of all but a first of the selected titles, modifying file numbers of video object files of the all but the first of the selected titles to be in sequence with the video object files of a first selected title, and modifying the title management section of the first selected title, to be associated with the renumbered video object files of the all but the first of the selected titles.*

*8. A system, comprising:*

*a media server configured to receive a plurality of title description modules, where each title description module is associated with a compiled media source from a plurality of previously compiled media sources and contains analysis results of the compiled media source, wherein the media server stores a title description module for each of the plurality of title description modules as a plurality of title records in a title database; and*

*a creation server configured to receive a request to produce the media image of selected titles, each of the selected titles being associated with a compiled media source from the plurality of compiled media sources and having a title management section, at least one of the selected titles being a video title,*

*wherein the creation server further comprises,*

*retrieving each of the title description modules associated with each of the selected titles from the plurality of title records,*

*generating a management module based on the title description modules, and*

*producing the media image by modifying the management module according to parameters extracted from the title description modules, copying the plurality of complied media sources associated with each of the images of selected titles, and by eliminating a title management section of all but a first of the selected titles, modifying file numbers of video object files of the all but the first of the selected titles to be in sequence with the video object files of a first selected title, and modifying the title management section of the first selected title, to be associated with the renumbered video object files of the all but the first of the selected titles.*

*9. A computer-readable medium containing instructions that, when executed by a processor, causes the processor to:*

*provide a plurality of previously compiled DVD titles;*

*retrieve a plurality of title description modules, wherein each title description module is associated with one of said previously compiled DVD titles and contains analysis results of that title;*

*generate a DVD management nodule from said title description modules;*

*eliminate a title management section of all but a first of the previously compiled DVD titles;*

*modify file numbers of the VOB files of the all but the first previously compiled DVD titles to be in sequence with the VOB files of the first previously compiled DVD title; and*

*modify the title management section of the first previously compiled DVD title, to be associated with both the first previously compiled DVD title and the all but the first of the previously compiled DVD titles in the provided previously compiled DVD titles.*

*10. A method, comprising:*

*receiving a request to produce a DVD image of selected titles, each said selected titles being associated with a previously compiled DVD title, at least one of said selected titles being a video title;*

*retrieving a plurality of title description modules, wherein each title description module is associated with a selected one of said selected titles and contains analysis results of that title;*

*generating a DVD management module from said plurality of title description modules;*

*producing a DVD image from said DVD management module and from said compiled versions of said selected titles eliminating a title management section of all but a first of said selected titles;*

*modifying file numbers of VOB files of said all but the first of said selected titles to be in sequence with the VOB files of a first selected title; and*

*modifying the title management section of said first selected title, to be associated with the renumbered VOB files of said all but the first of said selected titles.*

* * * * *